(12) United States Patent
Maeda

(10) Patent No.: US 9,316,385 B2
(45) Date of Patent: Apr. 19, 2016

(54) LIGHTING DEVICE AND DISPLAY DEVICE

(75) Inventor: Yasutoshi Maeda, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 308 days.

(21) Appl. No.: 13/980,645

(22) PCT Filed: Jan. 19, 2012

(86) PCT No.: PCT/JP2012/051051
§ 371 (c)(1),
(2), (4) Date: Jul. 19, 2013

(87) PCT Pub. No.: WO2012/102163
PCT Pub. Date: Aug. 2, 2012

(65) Prior Publication Data
US 2013/0301241 A1   Nov. 14, 2013

(30) Foreign Application Priority Data

Jan. 26, 2011 (JP) .................................. 2011-014392

(51) Int. Cl.
*F21V 29/00* (2015.01)
*F21V 29/02* (2006.01)
*G02F 1/1335* (2006.01)

(52) U.S. Cl.
CPC ................. *F21V 29/00* (2013.01); *F21V 29/02* (2013.01); *G02F 1/133606* (2013.01); *G02F 1/133603* (2013.01); *G02F 2001/133607* (2013.01); *G02F 2001/133628* (2013.01)

(58) Field of Classification Search
CPC .......... G02F 1/133603; G02F 1/33606; G02F 2001/133607; G02F 2001/133628; G02F 1/1336; F21V 29/00; F21V 29/02; F21V 29/22; F21Y 2101/02
USPC ........................................................ 362/97.1
See application file for complete search history.

(56) References Cited

U.S. PATENT DOCUMENTS

| 4,570,206 A * | 2/1986 | Deutsch ......................... 362/103 |
| 2007/0103908 A1* | 5/2007 | Tabito et al. ................... 362/294 |
| 2008/0101065 A1* | 5/2008 | Hsu et al. ....................... 362/234 |
| 2008/0111949 A1* | 5/2008 | Shibata et al. .................. 349/64 |
| 2009/0244472 A1* | 10/2009 | Dunn ............................. 349/161 |
| 2009/0268434 A1* | 10/2009 | Mita et al. ..................... 362/97.1 |

FOREIGN PATENT DOCUMENTS

JP  2007-317423 A  12/2007

* cited by examiner

*Primary Examiner* — Sean Gramling
*Assistant Examiner* — Naomi M Wolford
(74) *Attorney, Agent, or Firm* — Chen Yoshimura LLP

(57) ABSTRACT

A backlight device (lighting device) (12) according to the present invention includes a chassis (14) having an opened section (14b), optical members (15) disposed to cover the opened section (14b) in the chassis (14), LEDs (light source) (17) disposed outside of the chassis (14), and lens members (light guide members) (20) disposed in such a structure as to penetrate the chassis (14), the lens members guiding the light from the LEDs (17) into the chassis (14). An LED housing chassis (light source housing member) (19) that stores therein the LEDs (17) is attached to the chassis (14).

15 Claims, 11 Drawing Sheets

LIGHTING DEVICE AND DISPLAY DEVICE

TECHNICAL FIELD

The present invention relates to an illumination device, a display device, and a television receiver.

BACKGROUND ART

A liquid crystal panel used in a liquid crystal display device such as a liquid crystal television, for example, does not emit light, and thus, it is necessary to provide a separate backlight device as an illumination device. This backlight device is provided on the rear side of the liquid crystal panel (a side opposite to the display surface), and includes a chassis having an opened section on a side facing the liquid crystal panel, a light source stored in the chassis, and optical members (diffusion sheet and the like) that are disposed facing the light source and covering the opened section of the chassis, the optical members being provided to efficiently emit light from the light source toward the liquid crystal panel. LEDs can be used as the light source out of the above-mentioned constituting members of the backlight device, for example, and in such a case, an LED substrate having the LEDs mounted thereon is stored in the chassis.

The disclosure of Patent Document 1 below is one example of the backlight device that uses LEDs as the light source.

RELATED ART DOCUMENT

Patent Document

Patent Document 1: Japanese Patent Application Laid-Open Publication No. 2007-317423

Problems to be Solved by the Invention

In recent years, the number of LEDs disposed in the chassis is increasing to address the demand for higher brightness and the like, causing heat emitted from the LEDs to be a problem. If the heat from the LEDs is trapped in the chassis and transmitted to optical members disposed covering the opened section of the chassis, there is a possibility that warping or deformation of the optical members occurs. Furthermore, if the heat from the LEDs is transmitted to the liquid crystal panel, there is a possibility that the gradation characteristics are changed, and the displayed image is adversely affected.

SUMMARY OF THE INVENTION

The present invention was completed in view of the above-mentioned situation, and an object thereof is to solve the problem caused by the heat generated from the light source.

Means for Solving the Problems

An illumination device of the present invention includes: a chassis that has an opened section; an optical member disposed to cover the opened section of the chassis; a light source disposed outside of the chassis; and a light guide member disposed in such a structure as to penetrate the chassis, the light guide member guiding light emitted from the light source into the chassis.

With this configuration, because the light source is provided outside of the chassis, it is possible to prevent the temperature in the chassis from increasing due to heat generated by the light source. As a result, it is possible to prevent the optical member disposed to cover the opened section of the chassis from being deformed or the like due to the heat from the light source. Because light from the light source that is disposed outside of the chassis is guided into the chassis by the light guide member disposed in such a structure as to penetrate the chassis, and is radiated to the optical member covering the opened section of the chassis, it is possible to prevent a situation in which the light utilization is reduced as a result of disposing the light source outside of the chassis.

As embodiments of the present invention, the following configurations are preferred.

(1) The chassis is provided with a light source housing member that stores the light source therein. With this configuration, the light source can be installed by attaching the light source housing member that therein stores the light source to the chassis, and therefore, productivity in the assembly process can be improved. If the light source housing member is configured so as to be removable from the chassis, it makes it easier to perform replacement work and the like for the light source.

(2) The light source housing member has an air hole that opens toward the outside. With this configuration, even when the light source generates heat, because air can flow in and out the light source housing member through the air hole that opens toward the outside, it becomes less likely that heat is trapped in the light source housing member. Therefore, in the light source, it is possible to prevent a reduction in light-emitting efficiency or product life due to heat generated from the light source, and also, because the heat transfer from the light housing member to the chassis is suppressed, it is possible to prevent the deformation or the like of the optical member more reliably.

(3) A suction fan is provided so as to blow air into the light source housing member from the outside through the air hole. With this configuration, by guiding air into the light source housing member from the outside by the suction fan, it is possible to efficiently suppress an increase in temperature inside of the light source housing member caused by the heat generated by the light source.

(4) A cooler is provided so as to cool the air blown by the suction fan. With this configuration, because the air that was cooled by the cooler can be guided into the light source housing member, it is possible to suppress an increase in temperature inside of the light source housing member caused by the heat generated by the light source reliably and more efficiently.

(5) An exhaust fan is provided so as to blow the air out from the inside of the light source housing member through the air hole. With this configuration, by guiding the air out from the inside of the light source housing member by the exhaust fan, it is possible to efficiently suppress an increase in temperature inside of the light source housing member caused by the heat generated by the light source.

(6) The light source housing member includes a heat sink disposed therein. With this configuration, heat from the light source can be efficiently dissipated into the air inside of the light source housing member by the heat sink, and by letting the air out from the light source housing member through the air hole, an increase in temperature in the light source housing member can be efficiently suppressed.

(7) In the light source housing member, a light source substrate having a plurality of light sources mounted thereon is stored, and the heat sink is attached to the light source substrate. With this configuration, heat transmitted to the light source substrate from the light source can be efficiently dissipated into the air inside of the light source housing member by the heat sink attached to the light source substrate, and by letting the air out from the light source housing member through the air hole, an increase in temperature in the light source housing member can be suppressed more efficiently.

(8) The chassis has a bottom part that faces the optical member covering the opened section, and the light source housing member is disposed on the bottom part on a side opposite to the optical member. With this configuration, the bottom part of the chassis is interposed between the optical member and the light source housing member, and therefore, it becomes harder for the heat to be transferred to the optical member from the light source housing member that stores therein the light source, which makes the deformation or the like less likely to occur in the optical member.

(9) Between respective opposing surfaces of the bottom part and the light source housing member, a restricting member is provided to set a gap between the respective opposing surfaces. With this configuration, by setting the gap between the two opposing surfaces of the bottom part of the chassis and the light source housing member by the restricting member, it is possible to secure a certain space inside of the light source housing member. Therefore, as opposed to the case in which the inner space of the light source housing member changes, the size of the inner space of the light source housing member can be kept constant, and as a result, by designing the light source housing member so as to ensure that the space has a sufficient size, it is possible to reliably prevent the heat from being transferred to the optical member.

(10) An insulating member is interposed between the chassis and the light source housing member. With this configuration, the heat transfer from the light source housing member to the chassis can be prevented by the insulating member, and therefore, the deformation or the like of the optical member becomes less likely to occur.

(11) The light source housing member has a wall that divides an inner space thereof into a first space and a second space, the first space being on the side of the chassis, the second space being on a side opposite to the chassis, and the light source is attached to the wall so as to be located in the first space. With this configuration, as opposed to the case in which the wall that has only the first space and not the second space is provided to the light source housing member, and the light source is attached to the wall, the heat capacity in the inner space of the light source housing member can be increased for the second space, while maintaining the positional relation of the light source with respect to the chassis. As a result, it is possible to efficiently suppress an increase in temperature in the light source housing member caused by the heat from the light source.

(12) The light source housing member has a first air hole and a second air hole, the first air hole opening toward the outside in the first space, the second air hole opening toward the outside in the second space. With this configuration, even when the light source generates heat, the air flows in and out the first space and the second space through the first air hole and the second air hole, respectively, and therefore, the heat is less likely to be trapped in the light source housing member.

(13) The light source substrate having a plurality of light sources is attached to the wall so as to be located in the first space. A first heat sink is attached to the light source substrate, while a second heat sink is attached to the wall so as to be located in the second space. With this configuration, the heat transferred from the light source to the light source substrate is dissipated into the air in the first space by the first heat sink that is located in the first space, and in addition, the heat transferred from the light source substrate to the wall is dissipated into the air in the second space by the second heat sink that is located in the second space. Furthermore, because the air in the first space and the air in the second space are made to go out through the first air hole and the second air hole, respectively, it is possible to suppress an increase in temperature inside of the light source housing member even more efficiently.

(14) The second heat sink is disposed so as to match in position with the light source in a plan view. With this configuration, the heat from the light source can be efficiently transferred to the second heat sink through the light source substrate and the wall, and therefore, even more excellent heat dissipating properties are attained.

(15) The chassis has an insertion hole that is an opening through which the light guide member is inserted, and a spacer is interposed between an edge of the insertion hole and the light guide member. With this configuration, the spacer fills the gap between the edge of the insertion hole and the light guide member, and therefore, it is possible to prevent dust and the like from entering the chassis from the outside. Also, because it is possible to block the air flow through the gap, the heat from the light source disposed outside of the chassis can be prevented from being transferred to the inside of the chassis.

(16) The light guide member has a light guide part at one end located outside of the chassis and a diffusion lens part at the other end located inside of the chassis. The light guide part guides light from the light source toward the other end, and the diffusion lens part diffuses the light. With this configuration, light from the light source can be efficiently guided to the diffusion lens part by the light guide part in the light guide member, and by emitting the light while diffusing it by the diffusion lens part, the light can be radiated to the optical member. As a result, the light utilization can be improved, and the light emitted from the optical member is less likely to have uneven brightness.

(17) The diffusion lens part is in a dome shape. With this configuration, the light is emitted from the diffusion lens part while being diffused sufficiently, which is more preferred in terms of suppressing uneven brightness.

(18) The light source is an LED. With this configuration, it is possible to achieve higher brightness, lower energy consumption, and the like.

In order to achieve the above-mentioned object, a display device of the present invention includes the above-mentioned illumination device and a display panel that performs display by using light from the illumination device.

With such a display device, in the illumination device that supplies light to the display panel, deformation or the like is less likely to occur in the optical member, and light emitted from the optical member is less likely to have uneven brightness, and therefore, it is possible to realize display with excellent display quality.

Examples of the display panel include a liquid crystal panel. As a liquid crystal display device, such a display device can be applied to various applications such as a television or the display of a personal computer, for example, and is particularly suitable for large screens.

Effects of the Invention

According to the present invention, a problem caused by the heat generated by the light source can be solved.

DETAILED DESCRIPTION OF EMBODIMENTS

<Embodiment 1>

Figure 2:
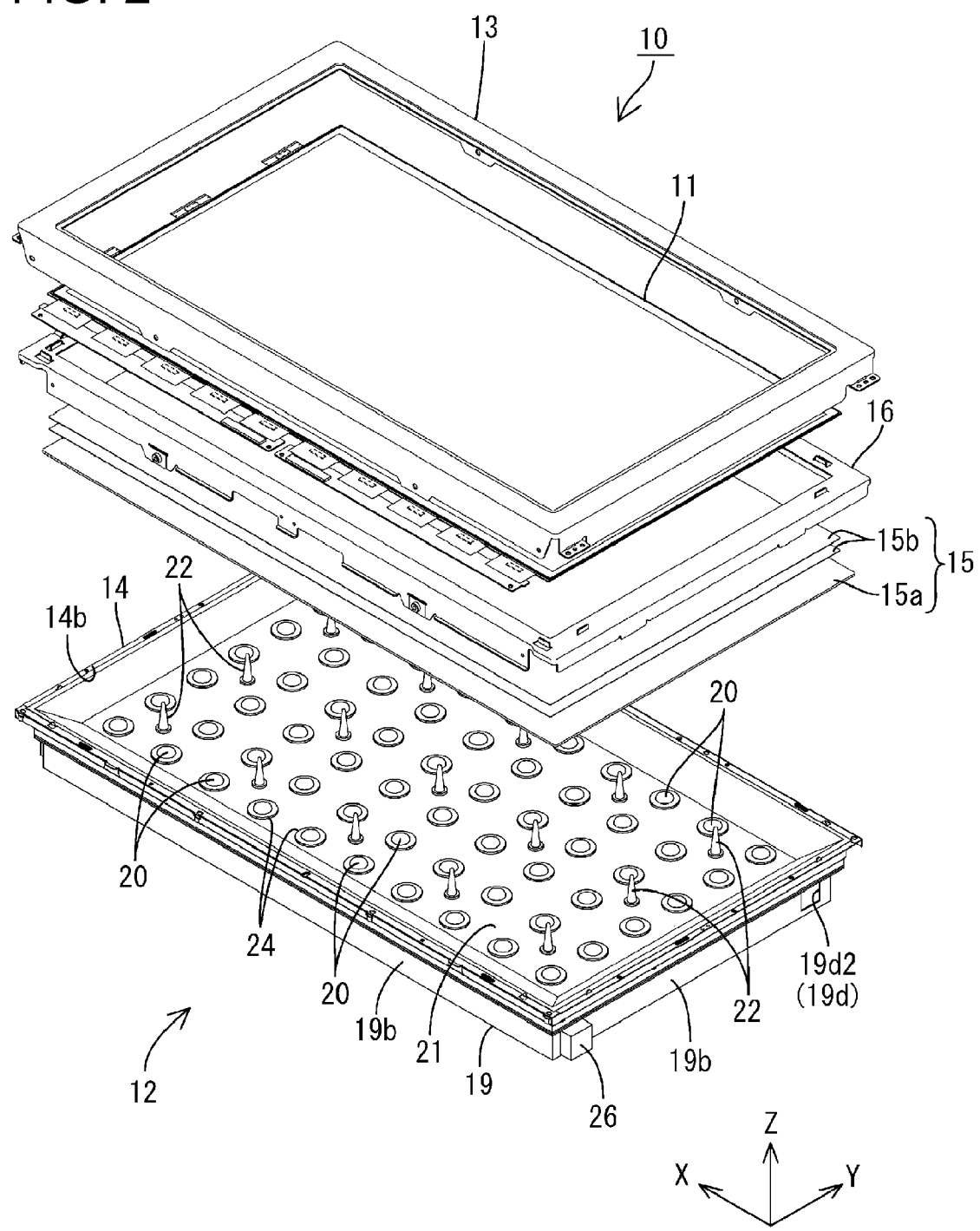
FIG. 2 is an exploded perspective view that shows a schematic configuration of a liquid crystal display device provided in the television receiver.
Figure 3:
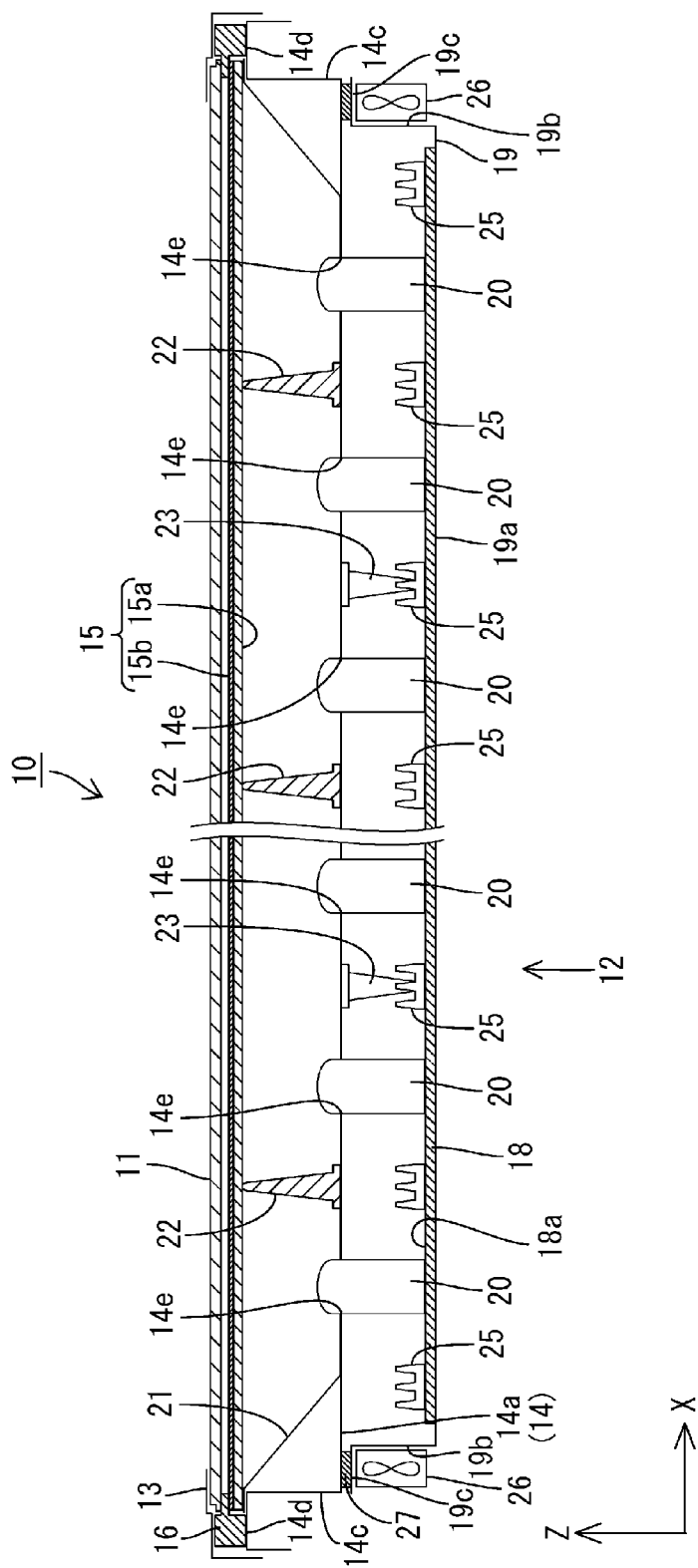
FIG. 3 is a cross-sectional view that shows a cross-sectional configuration of the liquid crystal panel along the longer side direction.
Figure 4:
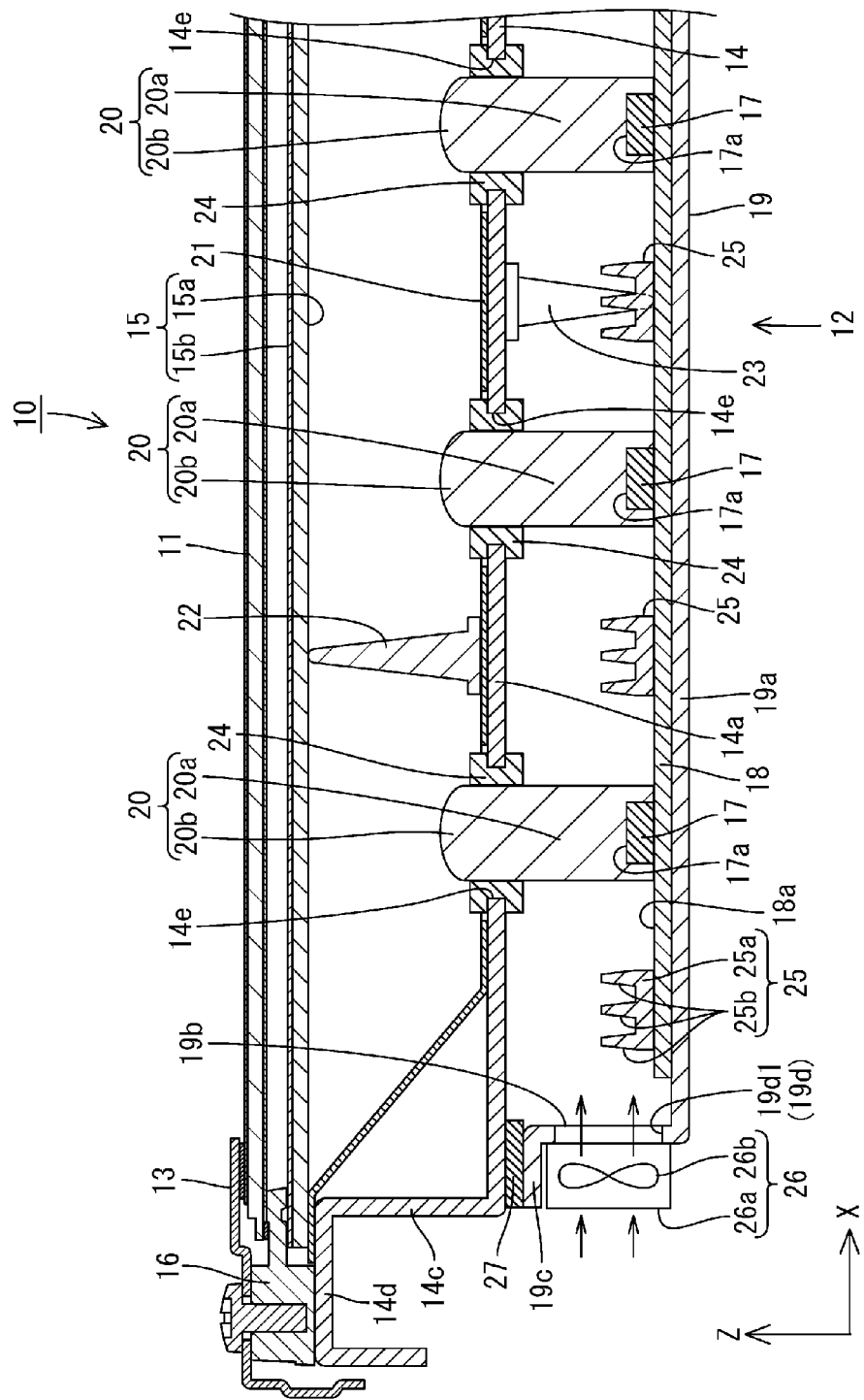
FIG. 4 is an enlarged cross-sectional view of a main part of FIG. 3.

Embodiment 1 of the present invention will be described with reference to FIGS. 1 to 5. In the present embodiment, a liquid crystal display device 10 will be described as an example. The drawings indicate an X axis, a Y axis, and a Z axis in a portion of the drawings, and each of the axes indicates the same direction for the respective drawings. The Y axis direction corresponds to the vertical direction and the X axis direction corresponds to the horizontal direction. Unless otherwise noted, "up" and "down" in the description is based on the vertical direction. The top side of FIGS. 3 and 4 is the front side, and the bottom side of FIGS. 3 and 4 is the rear side.

Figure 1:
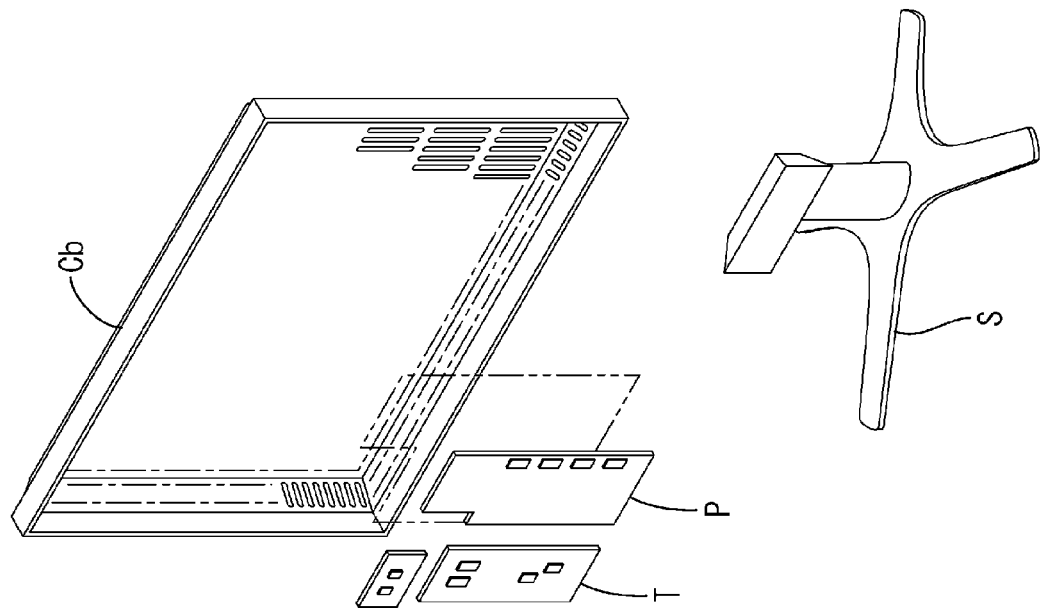
FIG. 1 is an exploded perspective view that shows a schematic configuration of a television receiver according to Embodiment 1 of the present invention.
Figure 1:
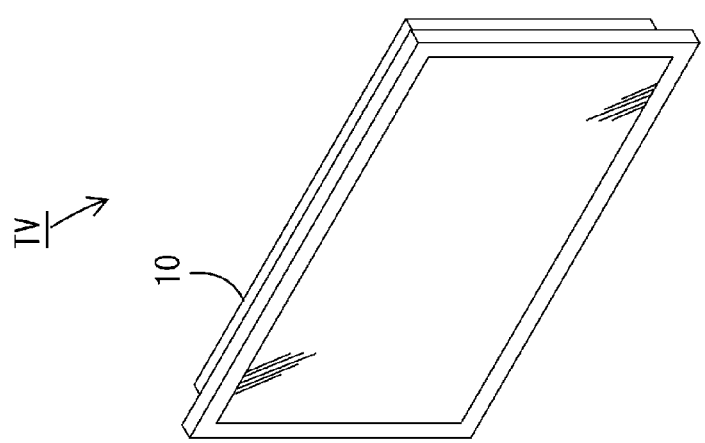
Figure 1:
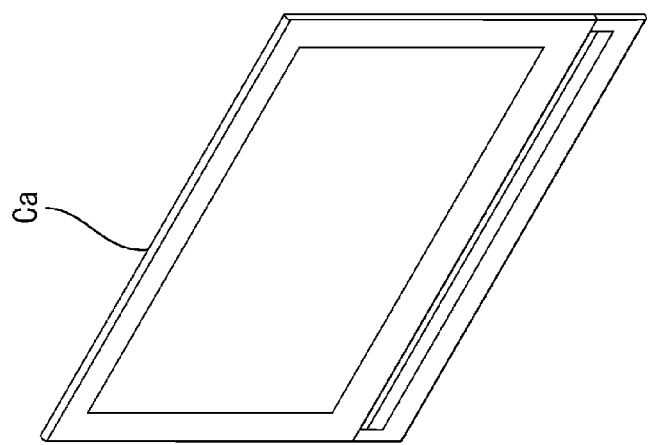

As shown in FIG. 1, the television receiver TV of the present embodiment includes the liquid crystal display device 10, front and rear cabinets Ca and Cb that sandwich the liquid crystal display device 10, a power source substrate P, a tuner T, and a stand S. The liquid crystal display device (display device) 10 is in a quadrangle shape (rectangle shape) that is longer in the horizontal direction as a whole, and is disposed such that the display surface is oriented along the vertical direction (Y axis direction). As shown in FIG. 2, the liquid crystal display device 10 includes a liquid crystal panel 11 that is a display panel, and a backlight device (illumination device) 12 that is an external light source, and these are held together as one component by a frame-shaped bezel 13 and the like.

"The display surface of the liquid crystal display device 10 is oriented along the vertical direction" in the present embodiment is not limited to a configuration in which the display surface of the liquid crystal display device 10 is parallel to the vertical direction, but also means that the display surface is oriented along a direction that is closer to the vertical direction than the horizontal direction, and includes configurations in which the display surface is inclined to the vertical direction at 0° to 45°, for example, and more preferably, at 0° to 30°.

Next, the liquid crystal panel 11 and the backlight device 12, which constitute the liquid crystal display device 10, will be described. The liquid crystal panel (display panel) 11 is formed in a rectangle that is longer in the horizontal direction in a plan view, and includes a pair of glass substrates bonded with a prescribed gap therebetween, and liquid crystal sealed between the two substrates. One of the glass substrates is provided with switching elements (TFTs, for example) connected to the source wiring lines and the gate wiring lines that intersect each other orthogonally, pixel electrodes connected to the switching elements, an alignment film, and the like. The other glass substrate is provided with color filters made of respective colored portions of R (red), G (green), B (blue), and the like disposed in a prescribed arrangement, an opposite electrode, an alignment film, and the like. Polarizing plates are respectively provided on outer sides of the two substrates.

Next, the backlight device 12 will be explained in detail. As shown in FIGS. 2 and 3, the backlight device 12 includes a chassis (first chassis) 14 that is substantially in a box shape having an opened section 14b on the front side (light-emitting side, the side facing the liquid crystal panel 11), optical members 15 disposed to cover the opened section 14b of the chassis 14, and a frame 16 that is disposed along the outer edge of the chassis 14 and that holds the outer edge of the optical members 15 between the chassis 14 and the frame 16. On the rear side of the chassis 14 (a side opposite to the light-emitting side; a side opposite to the liquid crystal panel 11 side), an LED housing chassis (light source housing member; second chassis) 19 is attached so as to be removable. The LED housing chassis 19 stores therein an LED substrate 18 having a plurality of LEDs (light-emitting diodes) 17, which are the light source, mounted thereon, and the like. In other words, in the backlight device 12 of the present embodiment, the LEDs 17, which are the light source, are disposed outside of the chassis 14. In addition, the backlight device 12 is provided with lens members (light guide members) 20 that are disposed in such a structure as to penetrate the chassis 14 and that guide light from the LEDs 17, which are provided outside of the chassis 14, into the chassis 14. Because these lens members 20 are disposed to face the optical members 15 below the rear surface of the liquid crystal panel 11, the backlight device 12 is a so-called direct light type backlight. Each component of the backlight device 12 will be described in detail below.

The chassis 14 is made of a metal such as aluminum, and as shown in FIGS. 2 and 3, is formed through sheet-metal forming to substantially a shallow box shape made of a bottom plate 14a having a horizontally long rectangular shape in a plan view in a manner similar to the liquid crystal panel 11, side plates 14c that rise toward the front side (light-emitting side) from outer edges of the respective sides of the bottom plate 14a, and supporting plates 14d that jut out toward the outside from the edges of the respective side plates 14c. The bottom plate 14a is disposed such that the plate surface thereof is parallel to the plate surface of the optical members 15 (liquid crystal panel 11), the longer side direction of the bottom plate 14a coincides with the X axis direction (horizontal direction) in each drawing, and the shorter side direction coincides with the Y axis direction (vertical direction). As shown in FIGS. 3 and 4, a plurality of insertion holes 14e are formed as openings in which the lens members 20 are inserted as described below. The insertion holes 14e are arranged in a matrix with a plurality of them being disposed along the longer side direction (X axis direction) and the shorter side direction (Y axis direction), respectively, in the bottom plate 14a. This arrangement pattern corresponds to an arrangement pattern of the LEDs 17 and the lens members 20 on the LED substrate 18 as described below (see FIG. 5). A plurality of attaching holes (not shown) for attaching first restricting members 22 and second restricting members 23, which will be described below, are formed as openings in prescribed positions in the bottom plate 14a. On the respective supporting plates 14d, the frame 16 and the optical members 15, which will be described next, can be placed. The frame 16 is fixed to the respective supporting plates 14d with screws.

In the chassis 14 described above, a reflective sheet 21 is disposed. The surface of the reflective sheet 21 is colored white that has an excellent light reflectivity. The reflective sheet 21 is made of a synthetic resin, and as shown in FIGS. 2 and 3, has a size that covers almost the entire inner surface of the chassis 14. This reflective sheet 21 can efficiently reflect light inside of the chassis 14 toward the optical members 15. The reflective sheet 21 has a bottom part that extends at least along the bottom plate 14a of the chassis 14, and inclined parts that rise from the outer edges thereof at an angle. A plurality of connecting holes are formed in the bottom part in positions that match with the respective insertion holes 14e in the bottom plate 14a in a plan view.

Furthermore, as shown in FIGS. 2 and 3, in the chassis 14, the first restricting members 22 are disposed. The first restricting members 22 are interposed between the optical members 15, which will be described next, and the bottom plate 14a (reflective sheet 21), thus maintaining a substantially constant gap between the optical members 15 and the bottom plate 14a, and between the optical members 15 and the lens members 20 that penetrate the bottom plate 14a. This makes it possible to attain a substantially even distribution of light that is radiated from the lens members 20 to the optical members 15, which is preferable in terms of suppressing the uneven brightness. The first restricting members 22 are made of a synthetic resin of a highly reflective white, are attached to the bottom plate 14a of the chassis 14 from the front side, and support the optical members 15 from the rear side. The plurality of first restricting members 22 are arranged in a matrix such that each first restricting member 22 is positioned between two insertion holes 14e (lens members 20) that are adjacent to each other diagonally in the bottom plate 14a (see FIG. 2).

As shown in FIG. 2, the optical members 15 are rectangular with a long side being the horizontal direction in a plan view, as in the liquid crystal panel 11 and the chassis 14. As shown in FIG. 3, the optical members 15 have the outer edges thereof placed on the supporting plates 14d, thereby covering the opened section 14b of the chassis 14, and are interposed between the liquid crystal panel 11 and the bottom plate 14a of the chassis 14 (reflective sheet 21). The optical members 15 include a diffusion plate 15a disposed on the rear (LEDs 17 side, opposite to the light-emitting side), and optical sheets 15b disposed on the front (liquid crystal panel 11 side, the light-emitting side). The diffusion plate 15a has a configuration in which a plurality of diffusion particles are dispersed inside a plate-shaped base member made of an almost completely transparent resin having a prescribed thickness, and has the function of diffusing light that is transmitted through. The optical sheets 15b are thinner than the diffusion plate 15a, and two optical sheets 15b are layered, one on top of the other (FIG. 2). Specific types of optical sheets 15b include a diffusion sheet, a lens sheet, a reflective polarizing sheet, and the like, for example, and it is possible to appropriately choose any of these as optical sheets 15b.

As shown in FIG. 2, the frame 16 is formed in a frame shape along the outer edges of the liquid crystal panel 11 and the optical members 15. The outer edges of the optical members 15 are sandwiched between the frame 16 and the respective supporting plates 14d (FIG. 3). The frame 16 receives the outer edges of the liquid crystal panel 11 from the rear side thereof, and sandwich the outer edges of the liquid crystal panel 11 with the bezel 13 that is disposed on the front side.

Next, the LED housing chassis 19 that stores therein the LEDs 17 and the LED substrate 18 disposed outside of the chassis 14 will be explained. The LED housing chassis 19 is made of a metal such as aluminum as in the chassis 14, and as shown in FIG. 3, is formed substantially in a shallow box shape that opens on the front side, or in other words, toward the chassis 14 as a whole. The LED housing chassis 19 is disposed on the rear side of the bottom plate 14a of the chassis 14, or in other words, a side opposite to the optical members 15, and the opened section thereof is covered by the bottom plate 14a of the chassis 14. The LED housing chassis 19 is made of a bottom wall 19a in a flat plate shape that extends along (in parallel with) the bottom plate 14a of the chassis 14, side walls 19b that rise toward the front side from the outer edges of the bottom wall 19a, and attaching walls 19c that jut out toward the outside from the respective edges of the side walls 19b.

Figure 5:
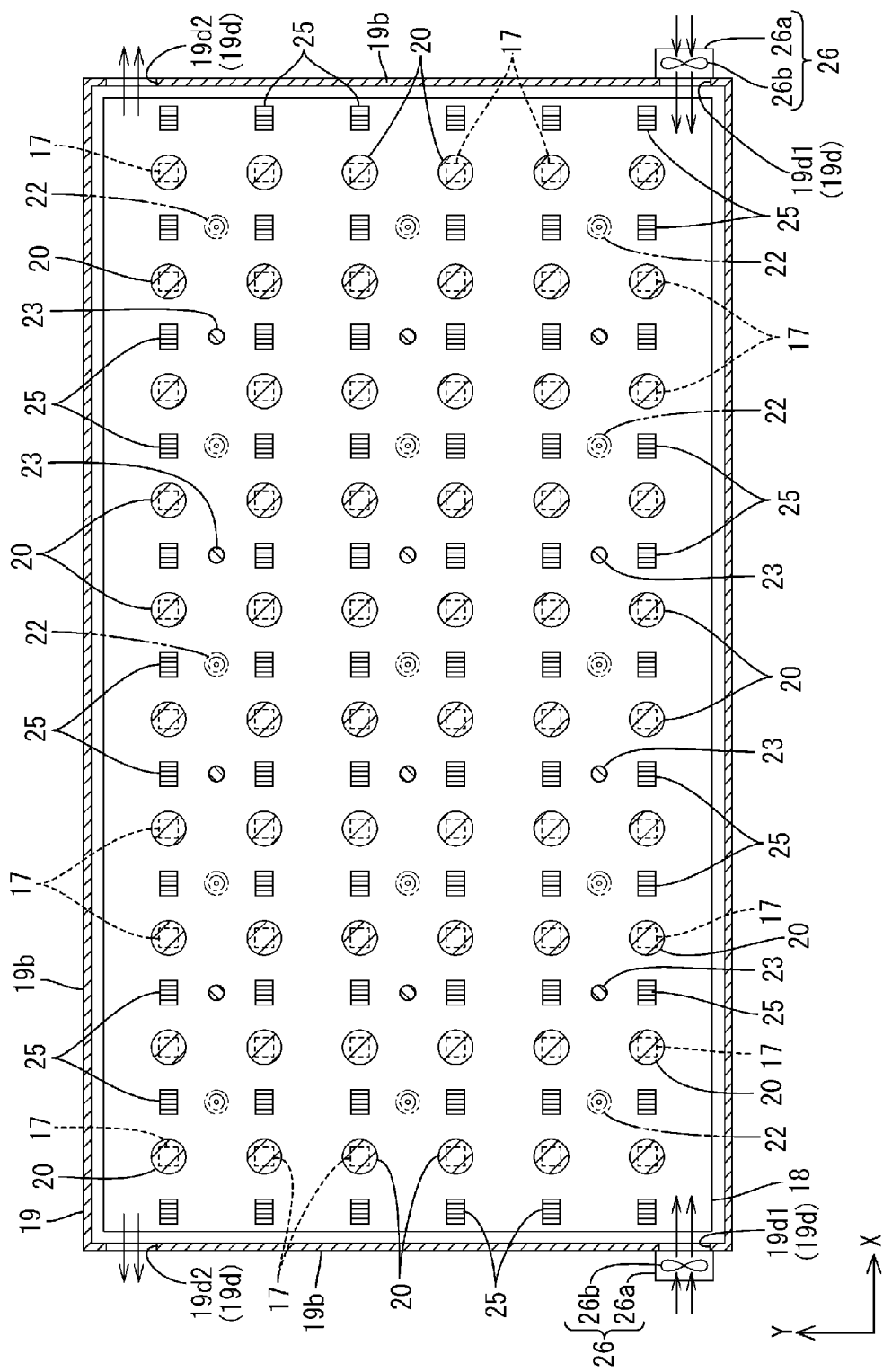
FIG. 5 is a horizontal cross-sectional view that shows an arrangement of LEDs, lens members, heat sinks, suction fans, and the like in an LED housing chassis.

As shown in FIGS. 4 and 5, the bottom wall 19a is formed in a horizontally long rectangular shape in a plan view as in the bottom plate 14a, and is disposed to face the bottom plate 14a of the chassis 14 with a prescribed gap therebetween. As shown in FIGS. 3 and 4, between the bottom wall 19a and the bottom plate 14a of the chassis 14 facing each other, the second restricting members 23 are interposed, which maintains a substantially constant gap between the respective opposing surfaces of the bottom wall 19a and the bottom plate 14a. With this second restricting members 23, the size of the space inside of the LED housing chassis 19, or in other words, the capacity is kept substantially constant. The second restricting members 23 are made a synthetic resin, and are attached to the rear side of the bottom plate 14a, out of the bottom wall 19a and the bottom plate 14a. As shown in FIG. 5, as in the first restricting members 22 described above, the plurality of second restricting members 23 are arranged in a matrix such that each second restricting member 23 is positioned between two LEDs 17 adjacent to each other diagonally on the LED substrate 18. In FIG. 5, the cross sections of the second restricting members 23 are shown, and the first restricting members 22 disposed inside of the chassis 14 are shown with the two-dot chain line.

As shown in FIGS. 4 and 5, the LED substrate 18 having the LEDs is attached to the bottom wall 19a. The LEDs 17, the LED substrate 18, and the lens members 20 will be explained in detail. The LED 17 has a configuration in which an LED chip is sealed by a resin material on a substrate part that is bonded to the LED substrate 18. The LED chips mounted on the substrate part has one type of primary light-emitting wavelength, and specifically, only emits blue light. On the other hand, the resin material that seals the LED chip has a fluorescent material dispersed therein, the fluorescent material emitting light of a prescribed color by being excited by the blue light emitted from the LED chip. This combination of the LED chip and the fluorescent material causes white light to be emitted overall. As the fluorescent material, a yellow fluorescent material that emits yellow light, a green fluorescent material that emits green light, and a red fluorescent material that emits red light, for example, can be appropriately combined, or one of them can be used on its own. The LEDs 17 are of a so-called top-type in which the side opposite to that mounted onto the LED substrates 18 is a light-emitting surface 17a.

As shown in FIGS. 4 and 5, the LED substrate 18 is disposed to cover the inner surface (front side surface) of the bottom wall 19a of the LED housing chassis 19, and is fixed by fixing members such as screws. As shown in FIG. 5, the LED substrate 18 is formed in a flat plate shape that is parallel to the bottom wall 19a, and is in a horizontally long rectangular shape in a plan view as in the bottom wall 19a, but the size thereof is slightly smaller than that of the bottom wall 19a. As shown in FIG. 4, the front side surface of the plate surfaces of the LED substrate 18, or in other words, the surface facing the bottom plate 14a, the LEDs 17 with the above-mentioned configuration are mounted, and this surface is the mounting surface (installation surface) 18a for the LEDs 17. As shown in FIG. 5, the LEDs 17 are arranged in a matrix with a plurality of them being respectively aligned along the X axis direction (longer side direction of the LED substrate 18) and the Y axis direction (shorter side direction of the LED substrate 18), respectively, in the LED substrate 18. Specifically, on the LED substrate 18, the LEDs 17 are arranged with ten being aligned along the X axis direction and six being aligned along the Y axis direction. The plurality of LEDs 17 are connected to each other through a not-shown wiring pattern made of a metal film formed on the LED substrate 18. The pitch of the respective LEDs 17 aligned along the X axis direction (the gap between adjacent LEDs 17) is constant. Similarly, the pitch of the respective LEDs 17 aligned along the Y axis direction is constant.

As shown in FIGS. 4 and 5, on the mounting surface 18a of the above-mentioned LED substrate 18, the lens members 20 for guiding light from the LEDs 17 into the chassis 14 are mounted, in addition to the LEDs 17. The lens members 20 are made of a synthetic resin material that is almost completely transparent (having a high transmission) such as acryl, and as shown in FIG. 4, the lens members 20 are attached to the mounting surface 18a of the LED substrate 18 covering the respective light-emitting surfaces 17a of the LEDs 17. The lens members 20 protrude from the mounting surface 18a of the LED substrate 18 toward the front side, penetrate a space inside of the LED housing chassis 19 along the Z axis direction (direction perpendicular to the plane of the bottom plate 14a and the bottom wall 19a), and further penetrate the bottom plate 14a of the chassis 14 by being inserted through the insertion holes 14e. In each lens member 20, a portion thereof positioned inside of the LED housing chassis 19, or in other words, one end thereof positioned outside of the chassis 14 is a light guide part 20a that guides light from an LED 17 toward the other end (into the chassis 14), while the other end that passed through the insertion hole 14a of the bottom plate 14a and is located inside of the chassis 14 is a diffusion lens part 20b that diffuses light. As shown in FIGS. 4 and 5, the light guide part 20a has a substantially cylindrical shape with a substantially constant width (diameter), and is disposed such that the center thereof matches the center of an LED 17. The light guide part 20a has a light-receiving surface that covers the entire light-emitting surface 17a of the LED 17. As shown in FIG. 4, light emitted through the light-emitting surface 17a of the LED 17 enters the light-receiving surface of the light guide part 20a, and thereafter by travelling straight to the diffusion lens part 20b through the light guide part 20a or by being totally reflected at an interface (outer circumferential surface) with the outside of the light guide part 20a, the light is guided toward the diffusion lens part 20b efficiently without leaking into the LED housing chassis 19 almost at all. The diffusion lens part 20b has a dome shape (semi-spherical shape), and by refracting light at the curved interface with the outside (light-emitting surface), it is possible to emit light while diffusing the light. The light emitted from the diffusion lens part 20b is diffused in a fan shape, thus making it possible to radiate light evenly to the optical members 15.

As shown in FIG. 4, a spacer 24 is interposed between each lens member 20 and an edge of an insertion hole 14a in the bottom plate 14a. The spacer 24 is made of a synthetic resin material (such as PP, PC, and a rubber material having an excellent elasticity, for example). The spacer 24 surrounds the lens member 20 and the edge of the insertion hole 14e entirely, and seals the gap between the two completely. As a result, it is possible to prevent dust and the like that can exist in the LED housing chassis 19 from entering the chassis 14 from the gap between the lens member 20 and the edge of the insertion hole 14e, and it is also possible to prevent the air that is directly exposed to the LEDs 17 inside of the LED housing chassis 19 from entering the chassis 14. The spacer 24 has eaves that extend from two ends of a tubular main body that surrounds the lens member 20 and the edge of the insertion hole 14e, and by having the eaves engaging in the edge of the insertion hole 14e, the spacer 24 is attached to the bottom plate 14a. The connecting holes in the reflective sheet 21 each have a size that is large enough to allow the lens member 20 and the spacer 24 to pass through.

In addition to the lens members 20, as shown in FIG. 4, heat sinks 25 are attached to the mounting surface 18a of the LED substrate 18. Each heat sink 25 is made of a metal material that has an excellent heat conductivity such as aluminum, and is constituted of a main body 25a that extends along the mounting surface 18a of the LED substrate 18, and a plurality of fins 25b that rise from the main body 25a toward the front side. The heat sink 25 is configured such that heat transferred from the LEDs 17, which is the light source, to the LED substrate 18 is efficiently transferred to the main body 25a through a wiring pattern mainly made of a metal film, and the transferred heat is efficiently dissipated into the air inside of the LED housing chassis 19 through the fins 25b having a larger surface area than the main body 25a. As shown in FIG. 5, the plurality of heat sinks 25 are arranged in a matrix in positions adjacent to the respective LEDs 17 (lens members 20) along the X axis direction on the LED substrate 18. In other words, each heat sink 25 is interposed between adjacent LEDs 17 along the X axis direction, and further in other words, each LED 17 is interposed between adjacent heat sinks 25 along the X axis direction.

As shown in FIG. 5, the side walls 19b that rise toward the front side from the respective outer edges of the bottom wall 19b, to which the LED substrate 18 is attached as described above, have air holes 19d formed therein. The air holes 19d open toward the outside, thereby allowing the air to flow in and out the LED housing chassis 19. Specifically, the air holes 19d are formed in a pair of side walls 19b that extend along the Y axis direction, or the vertical direction, out of the side walls 19b that form four sides of the LED housing chassis 19, and a pair of air holes 19d is disposed at respective upper and lower ends of each of these side walls 19b along the vertical direction. Of the pair of air holes 19d formed in one side wall 19b, one on the bottom in the vertical direction is an inlet air hole (inlet hole) 19d1 that guides the air from the outside into the LED housing chassis 19, and the other on the top in the vertical direction is an exhaust air hole (exhaust hole) 19d2 through which the air flows out from the inside of the LED housing chassis 19.

As shown in FIG. 5, at the bottom of each side wall 19b having the air holes 19d formed therein along the vertical direction, a suction fan 26 is attached to blow the air into the inlet air hole 19d1. The suction fan 26 is made of a fan box 26a attached to the outer surface of the side wall 19b, and a fan 26b stored in the fan box 26a, and by rotating the fan 26b in a prescribed direction, the fan draws the surrounding air in and blows the air into the LED housing chassis 19 through the inlet air hole 19d1 that is connected to the fan box 26a. The surrounding air, which was forcibly drawn by the suction fan 26, has a strong flow, and therefore, after entering through the inlet air hole 19d1, the air sufficiently circulates throughout the inner space of the LED housing chassis 19, and goes out from the exhaust air hole 19d2. When the LEDs 17 generate heat as a result of being lit, an upward air flow is generated in the inner space of the LED housing chassis 19, and by utilizing the upward air flow, the air entering from the inlet air hole 19d1 that is positioned on the lower side of the vertical direction can efficiently go out from the exhaust air hole 19d2 that is positioned on the upper side of the vertical direction.

The attaching walls 19c that jut out toward the outside from the edges of the respective side walls 19b of the LED housing chassis 19 are attached to the bottom plate 14a of the chassis 14 through an insulating member 27. The insulating member 27 made of a foam resin material (such as foam urethane, for example) that has an excellent insulating property is formed in a plate shape that is parallel to the attaching walls 19c and the bottom plate 14a, and are in close contact with the two while being sandwiched therebetween. As a result, even if the heat from the LEDs 17 is transferred to the LED housing chassis 19, the heat is not likely to be transferred from the LED housing chassis 19 to the chassis 14.

The present embodiment has the above-mentioned structure, and the operation thereof will be explained next. When the liquid crystal display device 10 having the above-mentioned configuration is turned on, the drive of the liquid crystal panel 11, and the drive of the LEDs 17 of the LED substrate 18 are controlled by a not-shown control circuit. As shown in FIG. 3, light emitted from the LEDs 17 disposed outside of the chassis 14 is guided into the chassis 14 through the lens members 20 that are disposed in such a structure as to penetrate the chassis 14, and is radiated to the optical members 15 that covers the opened section 14b (see FIG. 2) of the chassis 14. By passing through the optical members 15, the light is converted inside the plane into planar light that has an almost completely even brightness, and thereafter is radiated to the liquid crystal panel 11. As a result, a prescribed image is displayed on the liquid crystal panel 11. Below the operation of the lens members 20 will be explained in detail.

As shown in FIG. 4, light emitted through the light-emitting surfaces 17a of the LEDs 17 enters the light-receiving surfaces of the light guide parts 20a of the lens members 20 almost entirely, and by travelling straight toward the diffusion lens parts 20b or by being totally reflected at the interface with the outside of the light guide parts 20a, the light is propagated inside of the lens members 20, and reaches the diffusion lens parts 20b. As a result, it is possible to effectively prevent the light in the lens members 20 from leaking to the outside, or in other words, leaking into the LED housing chassis 19, and also, it is possible to guide the light emitted from the LEDs 17 into the chassis 14 efficiently. This is useful in terms of enhancing brightness or reducing power consumption. After reaching the diffusion lens parts 20b, the light is refracted at the dome-shaped interface with the outside, and is therefore emitted into the chassis 14 while being diffused in a fan shape, and as a result, the light is radiated to the optical members 15 with almost no uneven distribution along the plane. This makes it more difficult for the light passing through the optical members 15 to have uneven brightness, and therefore, it is possible to improve the display quality of an image displayed in the liquid crystal panel 11.

The respective LEDs 17 generates heat as a result of being lit. In the present embodiment, because the LEDs 17 are disposed in the LED housing chassis 19 and are provided outside of the chassis 14, as opposed to the case in which the LEDs are disposed in the chassis, it is possible to prevent the temperature inside of the chassis 14 from increasing due to the heat generated by the LEDs 17. Next, the transfer route of the heat generated by the LEDs 17 as a result of being lit will be explained in detail. As shown in FIG. 4, the heat generated by the LEDs 17 is mainly transferred to the LED substrate 18, and spreads throughout the mounting surface 18a by the wiring pattern made of a metal film that is formed over the mounting surface 18a, in particular. On the mounting surface 18a, a plurality of heat sinks 25 are disposed so as to be adjacent to the respective LEDs 17 (see FIG. 5), and therefore, the heat from the LED substrate 18 is efficiently transferred to the respective heat sinks 25, and thereafter is dissipated into the air inside of the LED housing chassis 19 through the respective fins 25b of the heat sinks 25. The heat from the LEDs 17 is also transferred to the lens members 20, but most of the heat is dissipated into the air inside of the LED housing chassis 19. As shown in FIG. 5, the inner space of the LED housing chassis 19 is connected to the outer space through the air holes 19d, and therefore, by the air flowing in and out of the LED housing chassis 19 through the air holes, the heat dissipated into the air inside of the LED housing chassis 19 from the heat sinks 25 and the lens members 20 goes out. In addition, in the present embodiment, the suction fans 26 can draw the surrounding air into the LED housing chassis 19 through the inlet air holes 19d1, and because the flow of the incoming and outgoing air in the LED housing chassis 19 is increased, more heat can be released. The inlet air holes 19d1 are disposed on the relatively lower side of the vertical direction, and the exhaust air holes 19d2 are disposed on the relatively upper side of the vertical direction. This makes it possible to utilize the upward air flow caused by the heat generated by the LEDs 17 in the inner space of the LED housing chassis 19, and the flow of the incoming and outgoing air in the LED housing chassis 19 is increased, thereby further improving the heat dissipation efficiency. As described above, because the heat generated by the LEDs 17 can be released to the outside of the LED housing chassis 19 efficiently, it becomes possible to present a reduction in the light-emitting efficiency of the LEDs 17 or a reduction in product life of the LEDs 17, and also, it becomes possible to suppress the heat transfer from the LED housing chassis 19 to the chassis 14.

The heat transferred to the LED substrate 18 is not entirely dissipated into the air inside of the LED housing chassis 19, but as shown in FIG. 4, a part thereof is transferred from the LED substrate 18 to the bottom wall 19a of the LED housing chassis 19, to which the LED substrate 18 is attached. The heat transferred to the bottom wall 19a is transferred to the side walls 19b and the attaching walls 19c, but because of the insulating member 27 provided between the attaching walls 19c and the bottom plate 14a of the chassis 14, the heat is prevented from being transferred to the chassis 14. Because the spacers 24 close the gaps between the lens members 20 and the edges of the insertion holes 14e in the bottom plate 14a of the chassis 14, the air hardly flows through the gaps, and therefore, the heat transfer to the air inside of the chassis 14 is suppressed. Also, dust and the like are prevented from entering the chassis 14 through the gaps.

As described above, heat from the LEDs 17 is not likely to be transferred to the chassis 14 and the air inside of the chassis 14, and therefore, as shown in FIG. 4, it is possible to effectively suppress the heat transfer from the LEDs 17 to the optical members 15 that cover the opened section 14b of the chassis 14 (see FIG. 2) and that face the inner space of the chassis 14. Therefore, the optical members 15 can be prevented from undergoing thermal expansion or thermal contraction due to the heat from the LEDs 17, and deformation of the optical members 15 such as warping or bending can also be prevented. When the optical members 15 are less likely to deform, the uneven brightness is less likely to occur in the light passing through the optical members 15, and therefore, it is possible to improve the display quality of the display image displayed in the liquid crystal panel 11.

As described above, the backlight device (illumination device) 12 of the present embodiment includes: a chassis 14 that has an opened section 14b; an optical member 15 disposed to cover the opened section 14b of the chassis 14; an LED (light source) 17 disposed outside of the chassis; and a lens member (light guide member) 20 disposed in such a structure as to penetrate the chassis 14, the lens member 20 guiding light emitted from the LED 17 into the chassis 14.

With this configuration, because the LED 17 is disposed outside of the chassis 14, it is possible to prevent a temperature inside of the chassis 14 from increasing due to heat generated by the LED 17. As a result, it is possible to prevent the optical member 15 disposed to cover the opened section 14b of the chassis 14 from being deformed and the like due to the heat from the LED 17. Light emitted from the LED 17 disposed outside of the chassis 14 is guided into the chassis 14 by the lens member 20 disposed in such a structure as to penetrate the chassis 14, and is radiated to the optical member 15 that covers the opened section 14b of the chassis 14, and therefore, it is possible to prevent a situation in which light utilization is reduced as a result of disposing the LED 17 outside of the chassis 14. According to the present embodiment, a problem caused by the heat generated by the LED 17 can be solved.

An LED housing chassis (light source housing member) 19 that stores therein the LED 17 is attached to the chassis 14. With this configuration, the LED 17 can be installed by attaching the LED housing chassis 19 having the LED 17 therein to the chassis 14, and therefore, excellent assembly productivity can be attained. If the LED housing chassis 19 is configured so as to be removable from the chassis 14, replacement work or the like of the LED 17 can be made easier.

The LED housing chassis 19 is provided with an air hole 19d that opens toward the outside. With this configuration, even when the LED 17 generates heat, because the air can flow in and out the LED housing chassis 19 through the air hole 19 that opens toward the outside, it becomes less likely that heat is trapped in the LED housing chassis 19. Therefore, in the LED 17, it is possible to prevent a reduction in light-emitting efficiency or product life due to heat generated by the LED 17, and also, because the heat transfer from the LED housing chassis 19 to the chassis 14 is suppressed, it is possible to prevent the deformation and the like of the optical member 15 more reliably.

A suction fan 26 is provided so as to blow the air into the LED housing chassis 19 from the outside through the air hole 19d. With this configuration, by guiding the air into the LED housing chassis 19 from the outside by the suction fan 26, it is possible to efficiently suppress an increase in temperature inside of the LED housing chassis 19 caused by the heat generated by the LED 17.

The LED housing chassis 19 includes a heat sink 25 disposed therein. With this configuration, heat from the LED 17 can be efficiently dissipated into the air inside of the LED housing chassis 19 by the heat sink 25, and by letting the air out from the LED housing chassis 19 through the air hole 19d, an increase in temperature in the LED housing chassis 19 can be efficiently suppressed.

In the LED housing chassis 19, a LED substrate (light source substrate) 18 having a plurality of LEDs 17 mounted thereon is stored, and the heat sink 25 is attached to the LED substrate 18. With this configuration, the heat transmitted to the LED substrate 18 from the LED 17 can be efficiently dissipated into the air inside of the LED housing chassis 19 by the heat sink 25 attached to the LED substrate 18, and by the air going out of the LED housing chassis 19 through the air hole 19d, an increase in temperature in the LED housing chassis 19 can be suppressed more efficiently.

The chassis 14 has a bottom plate (bottom part) 14a that faces the optical member 15 covering the opened section 14b, and the LED housing chassis 19 is disposed on the bottom plate 14a on the side opposite to the optical member 15. In this configuration, the bottom plate 14a of the chassis 14 is interposed between the optical member 15 and the LED housing chassis 19, and therefore, the heat transfer from the LED housing chassis 19 that stores therein the LEDs 17 to the optical member 15 is suppressed, which makes the deformation and the like of the optical member 15 less likely to occur.

Between the respective opposing surfaces of the bottom plate 14a and the LED housing chassis 19, a second restricting member (restricting member) 23 is interposed so as to set the gap between the respective opposing surfaces. In this configuration, the gap between the respective opposing surfaces of the bottom plate 14a of the chassis 14 and the LED housing chassis 19 is set by the second restricting member 23, and therefore, it is possible to secure a certain space inside of the LED housing chassis 19. Therefore, as opposed to the case in which the inner space of the LED housing chassis 19 changes, the size of the inner space of the LED housing chassis 19 can be maintained constant, and therefore, by designing the LED housing chassis 19 to have a sufficient inner space, it is possible to reliably prevent the heat transfer to the optical member 15.

The insulating member 27 is interposed between the chassis 14 and the LED housing chassis 19. With this configuration, the heat transfer from the LED housing chassis 19 to the chassis 14 can be prevented by the insulating member 27, and therefore, it is possible to make the deformation and the like of the optical member 15 less likely to occur.

The chassis 14 has the insertion hole 14a in which the lens member 20 is inserted, and between the edge of the insertion hole 14e and the lens member 20, a spacer 24 is interposed. With this configuration, the spacer 24 fills the gap between the edge of the insertion hole 14e and the lens member 20, and therefore, it is possible to prevent dust and the like from entering the chassis 14 from the outside. Also, because it is possible to block the air flow through the gap, the heat from the LEDs 17 disposed outside of the chassis 14 can be prevented from being transferred to the inside of the chassis 14.

The lens member 20 has a light guide part 20a at one end thereof that is located outside of the chassis 14, and a diffusion lens part 20b at the other end thereof that is located inside of the chassis 14. The light guide part 20a guides light from the LEDs 17 toward the other end, and the diffusion lens part 20b diffuses the light. With this configuration, light from the LED 17 can be efficiently guided to the diffusion lens part 20b by the light guide part 20a in the lens member 20, and by the diffusion part 20b that emits the light while diffusing it, the light can be radiated to the optical member 15. As a result, the light utilization can be improved, and the light emitted from the optical member 15 is less likely to have uneven brightness.

The diffusion lens part 20*b* is formed in a dome shape. With this configuration, the light is emitted from the diffusion lens part 20*b* while being diffused sufficiently, which is more preferred in terms of suppressing uneven brightness.

The LED 17 is used as the light source. With this configuration, it is possible to achieve higher brightness, lower energy consumption, and the like.

<Embodiment 2>

Embodiment 2 of the present invention will be described with reference to FIGS. 6 and 7. Embodiment 2 shows an LED housing chassis 119 having a modified configuration. Descriptions of structures, operations, and effects similar to those of Embodiment 1 will be omitted.

Figure 6:
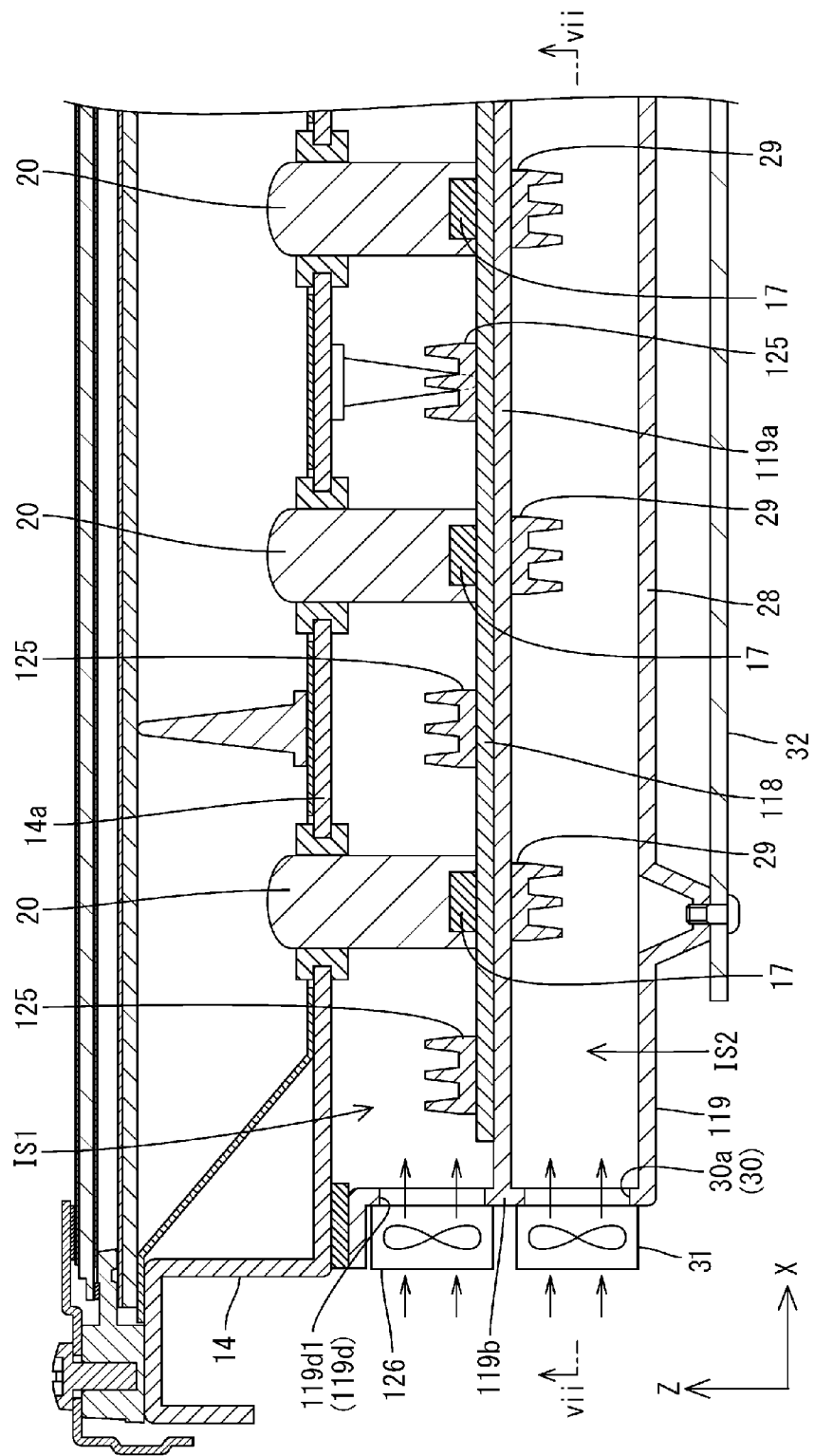
FIG. 6 is a cross-sectional view showing a cross-sectional configuration of the LED housing chassis in a liquid crystal display device of Embodiment 2 of the present invention.
Figure 7:
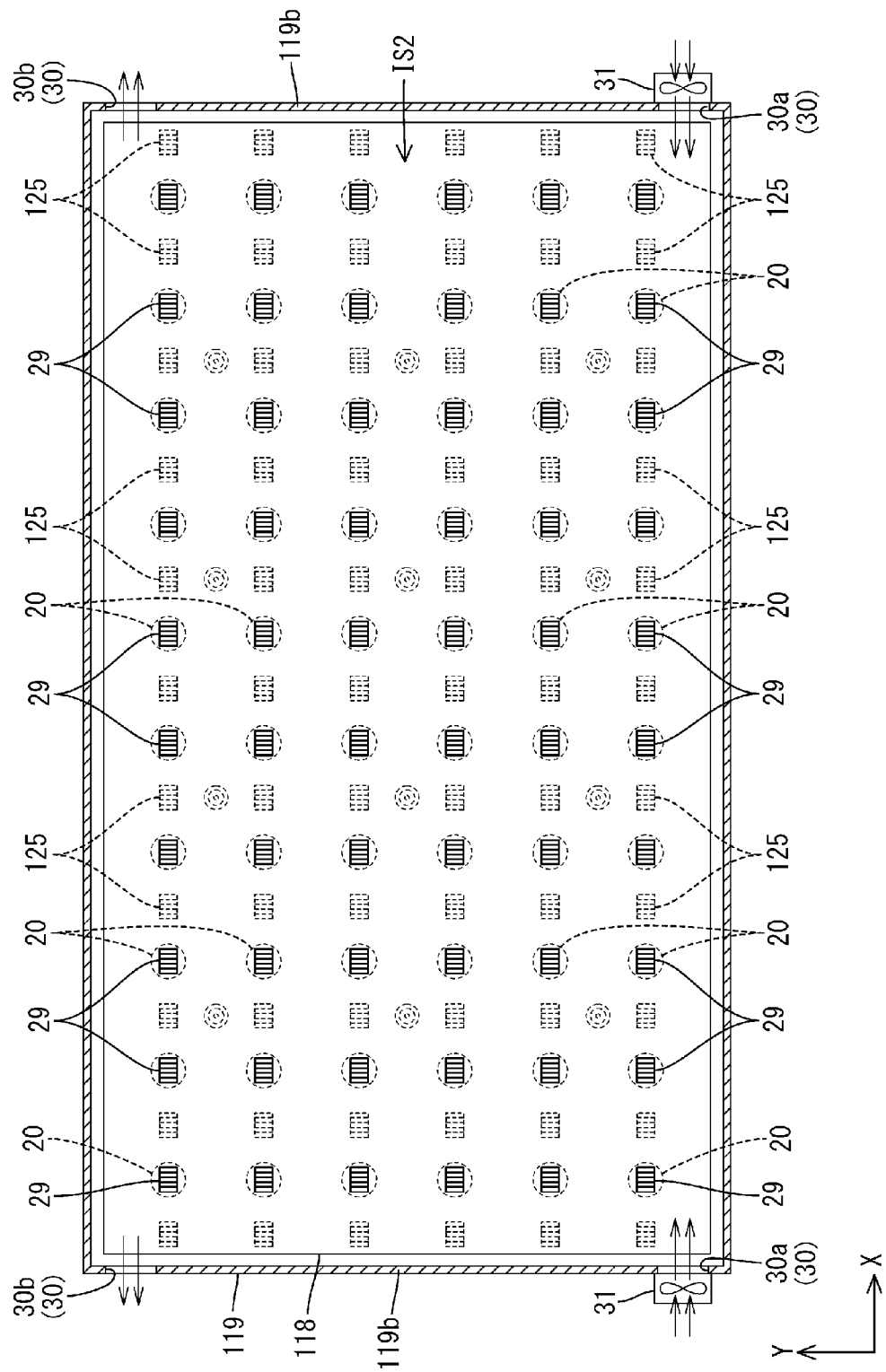
FIG. 7 is a cross-sectional view along the line vii-vii of FIG. 6.

As shown in FIG. 6, the LED housing chassis 119 of the present embodiment has a so-called double-bottom structure in which two bottom walls 119*a* and 28 are provided to divide the inner space thereof into two spaces IS1 and IS2. Specifically, the LED housing chassis 119 has a first bottom wall 119*a* to which the LED substrate 118 is attached, and a second bottom wall 28 that faces the rear side, or the side opposite to the chassis 14 (LED substrate 118), of the first bottom wall 119*a* across a prescribed gap. The side walls 119*b* are continued to the outer edges of the two bottom walls 119*a* and 28, respectively.

The first bottom wall 119*a* has substantially the same structure as the bottom wall 19*a* (see FIG. 4) described in Embodiment 1 (the positional relation with the bottom plate 14*a* with respect to the Z axis, and the like are substantially the same), and on the front side surface thereof, the LED substrate 118 and the first heat sink 125 are attached. The first heat sink 125 has substantially the same structure and arrangement as the heat sink 25 described in Embodiment 1 above (see FIGS. 4 and 5). The space between the first bottom wall 119*a* and the bottom plate 14*a* is a first space IS 1, and the LED substrate 118 and the first heat sinks 125 are disposed in the first space IS1.

On the other hand, the second bottom wall 28 is in a flat plate shape that is parallel to the first bottom wall 119*a*, and the space between the second bottom wall 28 and the first bottom wall 119*a* is a second space IS2. As described above, the inner space of the LED housing chassis 119 is divided into the first space IS1 and the second space IS2 by the first bottom wall 119*a*. On the rear side surface of the first bottom wall 119*a* facing the second space IS2 (the side opposite to the LED substrate 118), the second heat sinks 29 are provided. The second heat sinks 29 are disposed in the second space IS2, and can dissipate heat transferred from the LEDs 17 through the LED substrate 118 and the first bottom wall 119*a* into the air inside of the second space IS2. As shown in FIGS. 6 and 7, the second heat sinks 29 are disposed to correspond in positions to the LEDs 17 and the lens members 20 in the first bottom wall 119*a* in a plan view. Specifically, the second heat sinks 29 are disposed such that the centers thereof match with the centers of the LEDs 17 and the lens members 20 in the plane of the first bottom wall 119*a*. This improves the efficiency of the heat transfer to the second heat sinks 29 from the LEDs 17, and as a result, the heat is efficiently dissipated into the air inside of the second space IS2.

The side walls 119*b* continued to the first bottom wall 119*a* and the second bottom wall 28 have a first air hole 119*d* that opens toward the outside in the first space IS 1 and a second air hole 30 that opens toward the outside in the second space IS2. Of the two air holes, the first air hole 119*d* has substantially the same structure, arrangement, and the like as the air hole 19*d* (see FIG. 5) described in Embodiment 1 above. As shown in FIG. 7, a pair of second air holes 30 are disposed in each of the two side walls 119*b* that extend along the vertical direction, and as in the first air holes 119*d*, the one on the bottom in the vertical direction is the second air hole 30*a* for inlet, and the other one on the top in the vertical direction is the second air hole 30*b* for exhaust. A first suction fan 126 that can blow the air from the outside into the inside through the first air hole 119*d*1 for inlet is attached to the side wall 119*b*. Also, a second suction fan 31 that can blow the air from the outside into the inside through the second air hole 30*a* for inlet is attached to the side wall 119*b*. The first suction fan 126 and the second suction fan 31 have substantially the same structure and function as the suction fan 26 (see FIGS. 4 and 5) described in Embodiment 1.

As shown in FIG. 6, an external substrate 32 is attached to the rear side surface of the second bottom wall 28 facing the outside. Specific examples of the external substrate 32 include a power supply substrate having a power supply circuit, for example, a control substrate having a control circuit that controls the driving of the liquid crystal panel 11, an interface substrate, and a tuner substrate.

With the above-mentioned configuration, as shown in FIG. 6, heat generated by the LEDs 17 is transferred to the first heat sinks 125 through the LED substrate 118, and is dissipated into the air inside of the first space IS 1. Also, the heat generated by the LEDs 17 is transferred to the second heat sinks 29 through the LED substrate 118 and the first bottom wall 119*a*, and is dissipated into the air inside of the second space IS2. The inner space of the LED housing chassis 119 of the present embodiment is larger than that in Embodiment 1 above for the second space IS2, and because the heat capacity is made relatively large, heat is less likely to be trapped in the inner space. In addition, the first space IS1 and the second space IS2 open toward the outside through the first air holes 119*d* and the second air holes 30, and therefore, by the air flowing in and out, more heat can be released therefrom. Because the first suction fan 126 and the second suction fan 31 are disposed at the positions adjacent to the first air hole 119*d* and the second air hole 30, it is possible to forcibly draw in the surrounding air, which helps heat to be released more efficiently. Furthermore, the external substrate 32 is attached the outer surface of the second bottom wall 28, and because the second bottom wall 28, the second space IS2, and the first bottom wall 119*a* are disposed between the external substrate 32 and the LED substrate 118, the heat transfer to the external substrate 32 is effectively prevented, which makes the external substrate 32 less susceptible to the adverse effects due to heat.

As described above, in the present embodiment, the LED housing chassis 119 has the first bottom wall (wall) 119*a* that divides the inner space thereof into the first space IS1 closer to the chassis 14 and the second space IS2 on the side opposite to the chassis 14. The LEDs 17 are attached to the first bottom wall 119*a* through the LED substrate 118 so as to be positioned inside of the first space IS1. With this configuration, as compared with the case in which the LED housing chassis 19 has the bottom wall 19*a* that forms only the first space, and not the second space as in Embodiment 1 above (see FIG. 4), it is possible to increase the heat capacity of the inner space of the LED housing chassis 119 for the second space IS2, while maintaining the same positional relation of the LEDs 17 to the chassis 14. As a result, it is possible to efficiently suppress an increase in temperature inside of the LED housing chassis 119 as a result of heat generated by the LEDs 17.

Also, the LED housing chassis 119 has the first air holes 119*d* that open toward the outside in the first space IS 1, and the second air holes 30 that open toward the outside in the second space IS2, respectively. With this configuration, even when the LEDs 17 generate heat, the air flows in and out the first space IS1 and the second space IS2 through the first air holes 119*d* and the second air holes 30, and therefore, the heat is less likely to be trapped inside of the LED housing chassis 119.

The LED substrate 118 having a plurality of LEDs 17 mounted thereon is attached to the first bottom wall 119*a* so as to be positioned in the first space IS1. The first heat sinks 125 are disposed on the LED substrate 118, and the second heat sinks 29 are disposed on the first bottom wall 119*a* so as to be positioned in the second space IS2. With this configuration, heat transferred from the LEDs 17 to the LED substrate 118 is dissipated into the air inside of the first space IS1 through the first heat sinks 125 positioned inside of the first space IS1, and heat transferred from the LED substrate 118 to the first bottom wall 119*a* is dissipated into the air inside of the second space IS2 through the second heat sinks 29 positioned inside of the second space IS2. Furthermore, the air inside of the first space IS1 and the second space IS2 goes out through the first air holes 119*d* and the second air holes 30, respectively, and therefore, it is possible to suppress an increase in temperature inside of the LED substrate chassis 119 even more efficiently.

The second heat sinks 29 are disposed corresponding in positions to the LEDs 17 in a plan view. With this configuration, heat from the LEDs 17 can be transferred efficiently to the second heat sinks 29 through the LED substrate 118 and the first bottom wall 119*a*, and therefore, it is possible to improve the heat dissipating properties even more.

<Embodiment 3>

Embodiment 3 of the present invention will be described with reference to FIG. 8. In Embodiment 3, coolers 33 are additionally provided. Descriptions of structures, operations, and effects similar to those of Embodiment 1 will be omitted.

Figure 8:
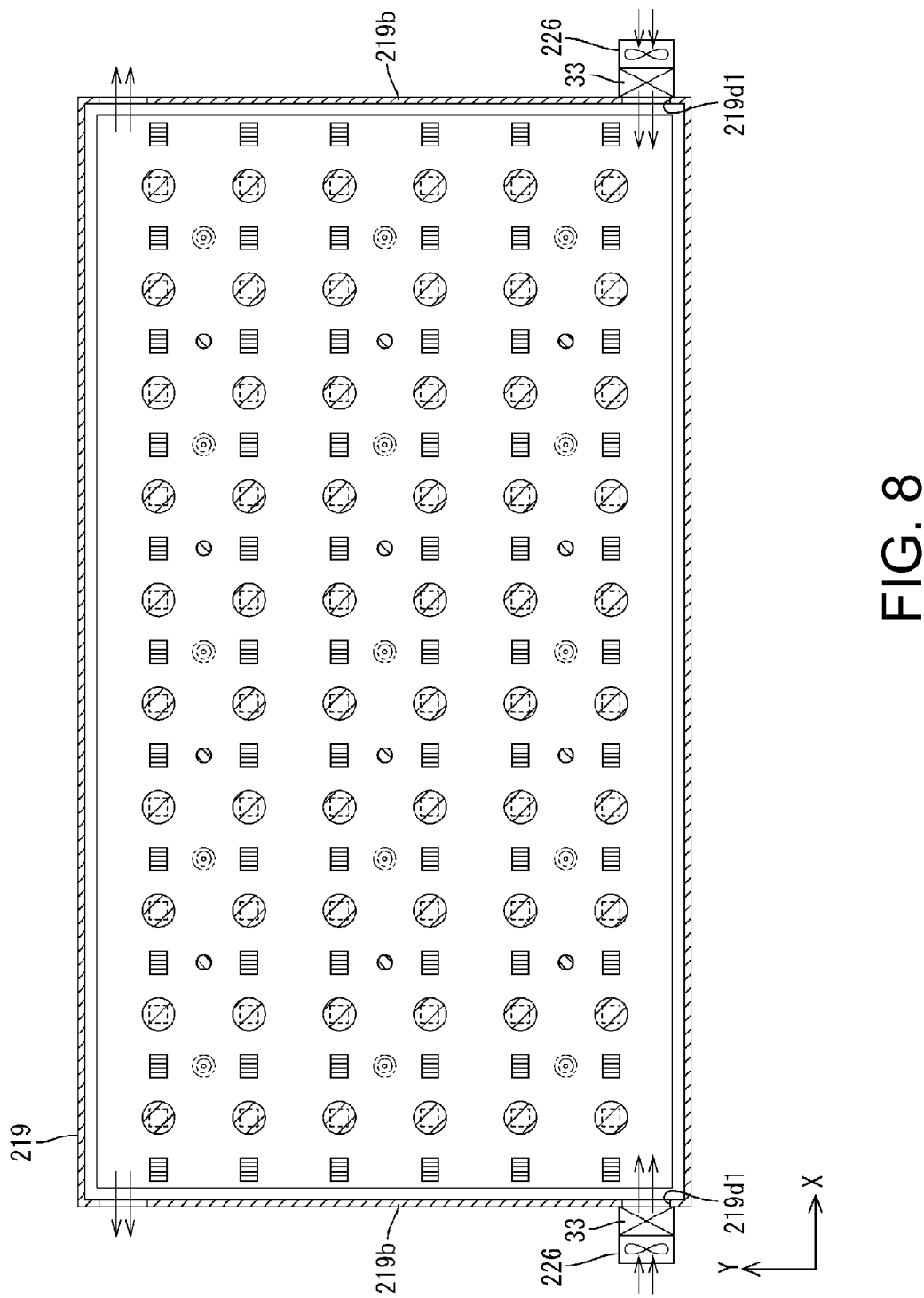
FIG. 8 is a horizontal cross-sectional view that shows an arrangement of suction fans and coolers in an LED housing chassis of Embodiment 3 of the present invention.

As shown in FIG. 8. an LED housing chassis 219 of the present embodiment includes the coolers 33 disposed to face inlet air holes 219*d*1. Each cooler 33 has a known refrigeration cycle by being connected to a compressor, a condenser, and the like, which are not shown, and can cool the air that is blown into the inlet air holes 219*d*1 from the outside. The coolers 33 are disposed between the respective side walls 219 having the air holes 219*d*1 and suction fans 226, and therefore, it is possible to efficiently cool the air that is blown into the air holes 219*d*1 by the suction fans 226. As a result, even when the outside temperature is higher than the temperature inside of the LED housing chassis 219, for example, it is possible to reliably lower the temperature inside of the LED housing chassis 219.

As described above, in the present embodiment, the coolers 33 are provided so as to cool the air that is blown into by the suction fans 226. With this configuration, the air that was cooled by the coolers 33 can be guided into the LED housing chassis 219, and therefore, it is possible to reliably and more efficiently suppress a temperature increase inside of the LED housing chassis 219 caused by the heat generated by the LEDs 17.

<Embodiment 4>

Embodiment 4 of the present invention will be described with reference to FIG. 9. In Embodiment 4, a configuration in which exhaust fans 34 are provided instead of the suction fans 26 (see FIG. 5), which were described in Embodiment 1 above, will be explained. Descriptions of structures, operations, and effects similar to those of Embodiment 1 will be omitted.

Figure 9:
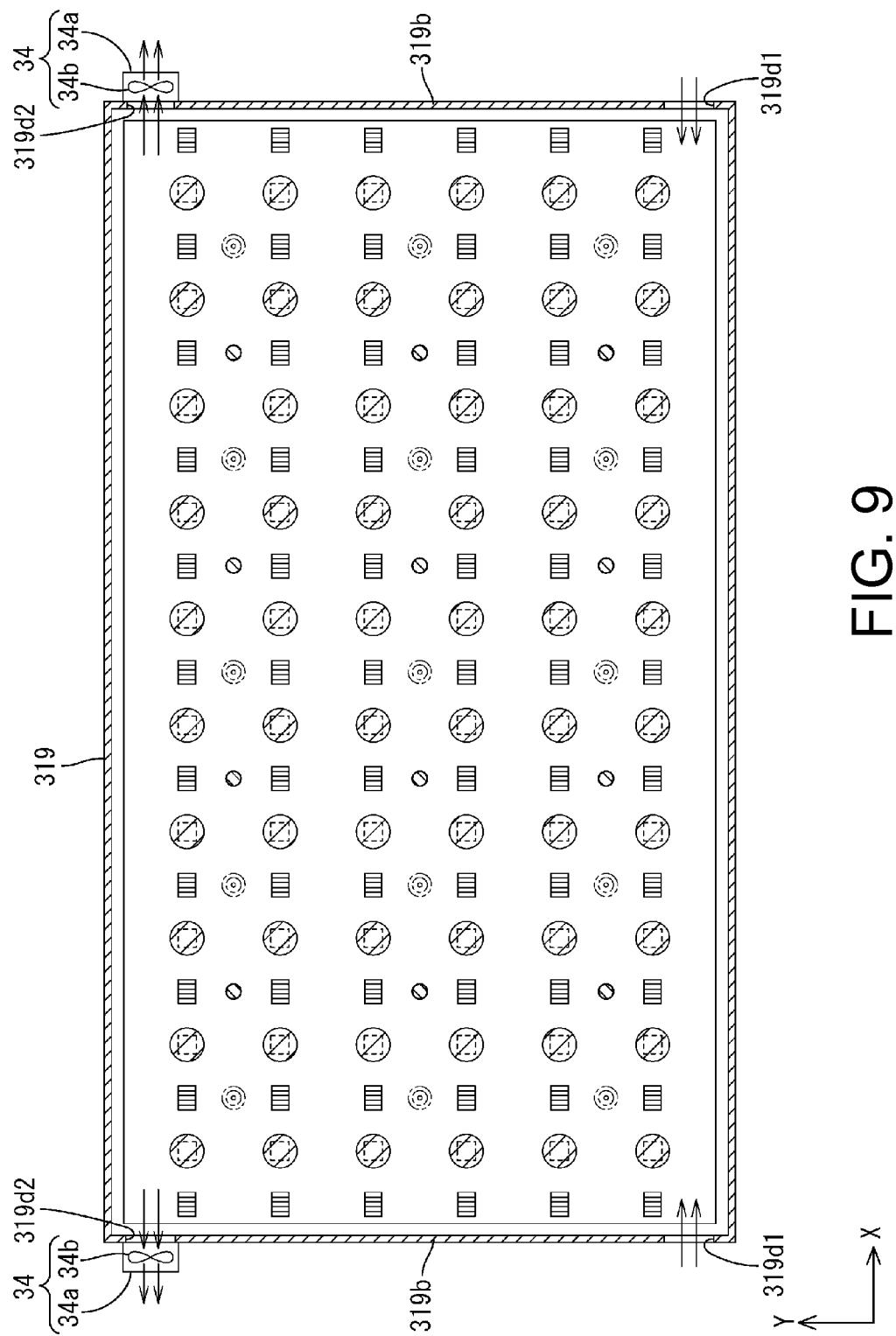
FIG. 9 is a horizontal cross-sectional view that shows an arrangement of exhaust fans in an LED housing chassis of Embodiment 4 of the present invention.

As shown in FIG. 9, an LED housing chassis 319 of the present embodiment is provided with the exhaust fans 34 disposed to face exhaust air holes 319*d*2. Each exhaust fan 34 is constituted of a fan box 34*a* attached to the outer surface of the side wall 319*b*, and a fan 34*b* stored in the fan box 34*a*, and by rotating the fan 34*b* in a prescribed direction, the fan blows out the air inside of the LED housing chassis 319 through the exhaust air hole 319*d*2. This helps more air to be drawn into the LED housing chassis 319 from the outside through inlet air holes 319*d*1, which causes the air to flow in and out the LED housing chassis 319 efficiently.

As described above, in the present embodiment, the exhaust fans 34 that can blow out the air from the inside of the LED housing chassis 319 through the air holes 319*d*2 are provided. With this configuration, by blowing out the air from the inside of the LED housing chassis 319 by the exhaust fans 34, it is possible to efficiently suppress an increase in temperature inside of the LED housing chassis 319, which is caused by the heat generated by the LEDs 17.

<Embodiment 5>

Embodiment 5 of the present invention will be described with reference to FIG. 10. In Embodiment 5, a configuration in which the arrangement of air holes 419*d* and suction fans 426 is changed will be described. Descriptions of structures, operations, and effects similar to those of Embodiment 1 will be omitted.

Figure 10:
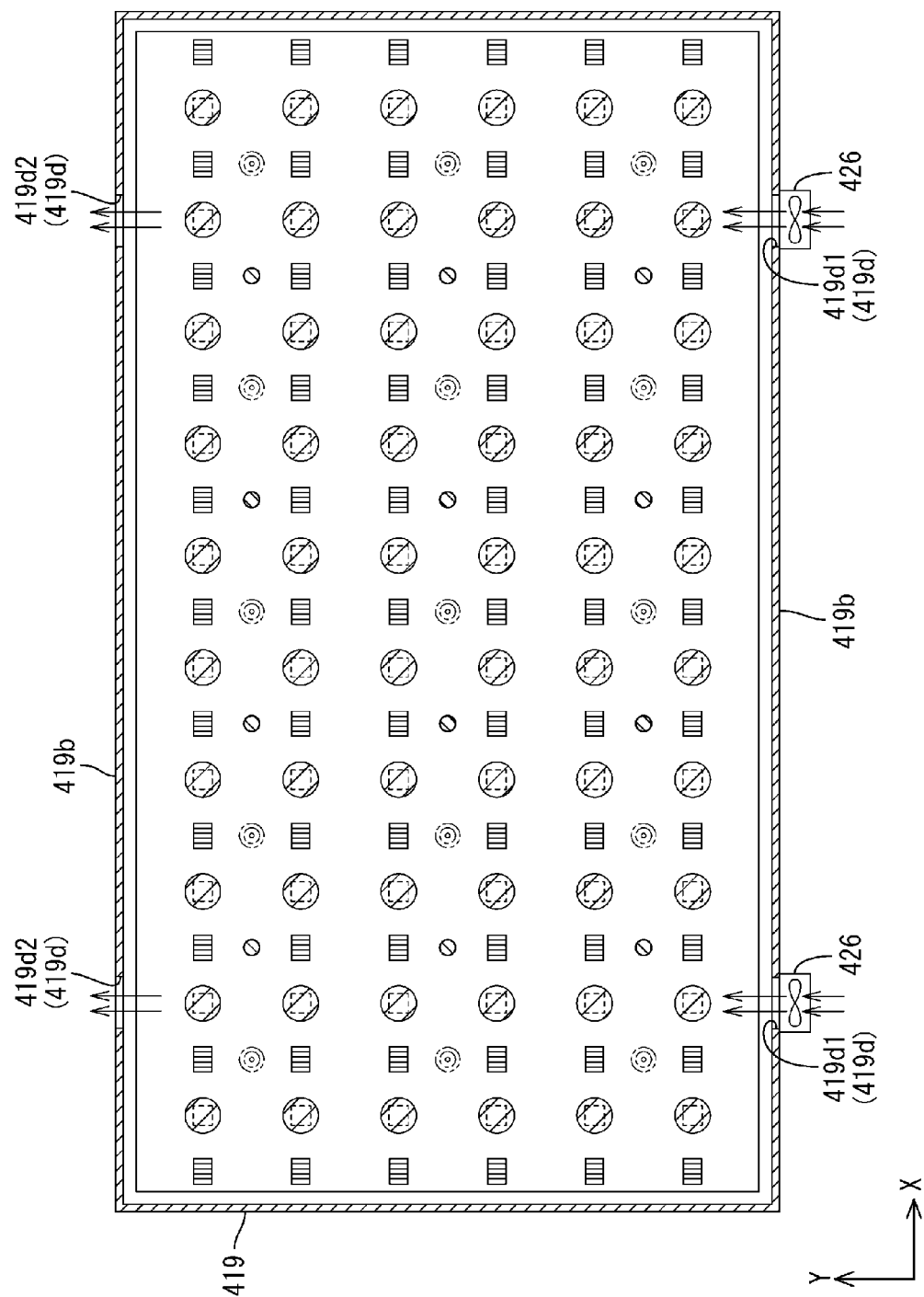
FIG. 10 is a horizontal cross-sectional view that shows an arrangement of suction fans in an LED housing chassis of Embodiment 5 of the present invention.

As shown in FIG. 10, the air holes 419*d* and the suction fans 426 of the present embodiment are provided in side walls 419*b* that extend along the X axis direction (horizontal direction perpendicular to the vertical direction) among side walls 419*b* of the LED housing chassis 419. Specifically, of a pair of side walls 419*b* that extend along the X axis direction, the lower side wall 419*b* in the vertical direction has a pair of inlet air holes 419*d*1 formed therein, and a pair of suction fans 426 is attached to face the inlet air holes 419*d*1, respectively. On the other hand, the upper side wall 419*b* in the vertical direction has a pair of exhaust air holes 419 formed therein. Each air hole 419*d* is formed so as to open vertically along the vertical direction. Even with such a configuration, it is possible to allow the air to flow in and out the LED housing chassis 419, thereby achieving high heat dissipating properties.

<Embodiment 6>

Embodiment 6 of the present invention will be described with reference to FIG. 11. Embodiment 6 shows an LED housing chassis 519 having a modified configuration. Descriptions of structures, operations, and effects similar to those of Embodiment 1 will be omitted.

Figure 11:
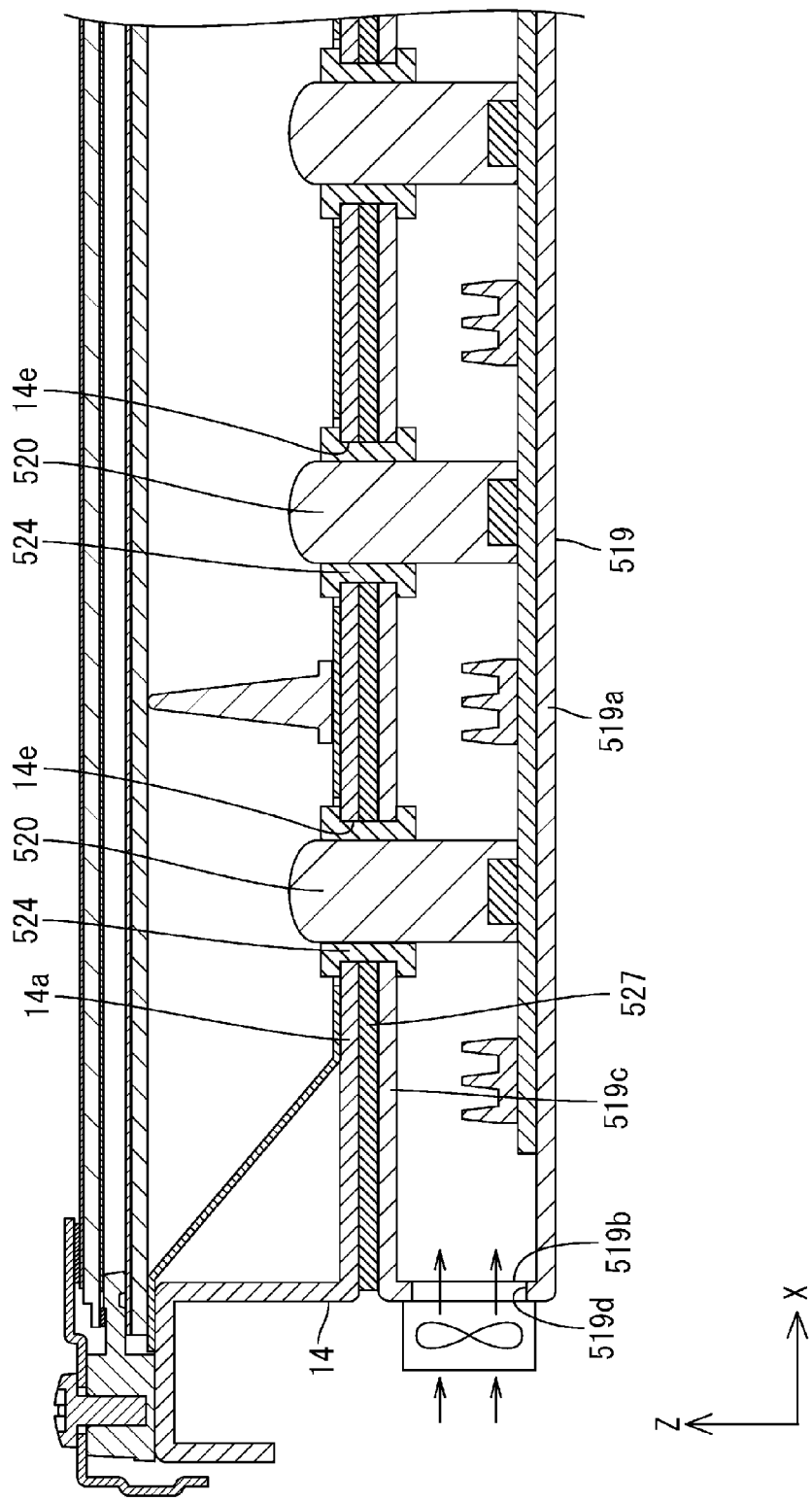
FIG. 11 is a cross-sectional view showing a cross-sectional configuration of an LED housing chassis in a liquid crystal display device of Embodiment 6 of the present invention.

As shown in FIG. 11, in the LED housing chassis 519 of the present embodiment, an attaching wall 519*c* continued from the ends of side walls 519*b* faces a bottom wall 519*a*, and therefore, the LED housing chassis 519 is formed in a substantially tubular shape in a cross-sectional view. Specifically, the attaching wall 519*c* is formed in a flat plate shape that has substantially the same size as the bottom wall 519*a* and the bottom plate 14*a* of the chassis 14 and that is parallel thereto, and sealing the inner space of the LED housing chassis 519 along with the side walls 519*b* and the bottom wall 519*a* (although the LED housing chassis 519 is connected to the outside through air holes 519*d*). The attaching wall 519*c* faces the bottom plate 14*a* of the chassis 14, and an insulating member 527 is interposed therebetween. The insulating member 527 is formed in a flat plate shape that has substantially the same size as the bottom plate 14*a* and the attaching wall 519*c* and that is parallel thereto. As a result, as compared with Embodiment 1, it is more difficult for the heat to be transferred from the LED housing chassis 519 to the chassis 14. The attaching wall 519*c* and the insulating member 527 have connecting holes that are connected to the insertion holes 14*e* of the chassis 14, and a spacer 524 is interposed between each edge thereof and a lens member 520.

<Other Embodiments>

The present invention is not limited to the embodiments shown in the drawings and described above, and the following embodiments are also included in the technical scope of the present invention, for example.

(1) In the embodiments above, the configuration in which the LED housing chassis is provided with suction fans or exhaust fans was described, but instead of the fans, the LED housing chassis may be provided with a water-cooling pipe through which refrigerant is circulated, thereby dissipating heat, for example. If sufficient heat dissipating properties can be obtained only with this water-cooling pipe, it is possible to omit air holes from the LED housing chassis. It is apparent that the water-cooling pipe can be provided in addition to the suction fans or the exhaust fans.

(2) In the embodiments above, the configuration in which the LED housing chassis is provided with one of the suction fans and the exhaust fans, but the present invention includes a configuration in which the LED housing chassis is provided with both suction fans and exhaust fans.

(3) In the embodiments above, the configuration in which the suction fans or the exhaust fans are disposed outside of the LED housing chassis was described, but it is also possible to provide the suction fans or the exhaust fans inside of the LED housing chassis.

(4) It is apparent that the configurations described in Embodiments 3 to 6 can be applied to the configuration described in Embodiment 2 above.

(5) It is apparent that the configurations described in Embodiments 3 and 4 can be applied to the configuration described in Embodiment 5 above.

(6) In addition to what was described in the embodiments above, specific number, arrangement, shape, size, and the like of the air holes can be appropriately changed. The same is true for the suction fans and the exhaust fans.

(7) In the embodiments above, the configuration in which the LED housing chassis is provided with the suction fans or the exhaust fans was described, but if sufficient heat dissipating properties can be ensured only with the air holes, it is possible to omit the suction fans or the exhaust fans. Similarly, the heat sinks may be omitted.

(8) In the embodiments above, the configuration in which the LED housing chassis has the suction fans that are for suction only or the exhaust fans that are for exhaust only was described, but it is also possible to use fans that can be rotated in both directions, for example, and that can demonstrate both of the suction function and the exhaust function. In such a case, the air holes are used for both inlet and exhaust.

(9) In the embodiments above, the configuration in which the LED housing chassis has the air hole formed therein was described, but it is also possible to omit the air holes.

(10) In Embodiment 2 above, the configuration in which the centers of the second heat sinks match the centers of the LEDs was described, but the present invention also includes a configuration in which the centers of the second heat sinks are offset from those of the LEDs, but partially overlap in a plan view. It is also possible that the second heat sinks do not overlap the LEDs in a plan view.

(11) In Embodiment 2 above, the configuration in which the first space and the second space in the LED housing chassis are divided without being connected to each other was described, but it is also possible to provide a connecting hole in the first bottom wall so as to connect the first space and the second space to each other.

(12) In Embodiment 2 above, the LED housing chassis may be divided into two parts, one surrounding the first space, and the other surrounding the second space.

(13) In Embodiment 3 above, the configuration in which the coolers are disposed between the suction fans and the side walls of the LED housing chassis was described, but the present invention also includes a configuration in which a suction fan is interposed between the cooler and the side wall of the LED housing chassis.

(14) In the embodiments above, the configuration in which the LED housing chassis is attached to the chassis so as to be removable therefrom, but the present invention also includes a configuration in which the LED housing chassis is attached to the chassis so as not to be removable.

(15) In the embodiments above, the configuration in which the second restricting members are attached to the bottom plate of the chassis was described, but the present invention also includes a configuration in which the second restricting members are attached to the bottom wall of the LED housing chassis.

(16) In addition to what was described in the embodiments above, the number, arrangement, and the like of the LEDs (lens members) and the heat sinks on the LED substrate can be appropriately changed, the number, arrangement, and the like of the first restricting members in the chassis can be appropriately changed, and the number, arrangement, and the like of the second restricting members in the LED housing chassis can be appropriately changed.

(17) In addition to the embodiments above, it is also possible to omit the respective restricting members.

(18) In the embodiments above, the direct-lighting type backlight device was described as an example, but the present invention can also be applied to an edge-lighting type backlight device that has a light guide plate. In such a case, the LED housing chassis is attached to a side plate of the chassis, and insertion holes through which lens members are inserted are formed in the side plate of the chassis.

(19) In the embodiments above, the LED that includes an LED chip emitting blue light only and that emits substantially white light by a fluorescent material was used, but the present invention also includes a configuration using an LED that includes an LED chip emitting ultraviolet (blue-violet light) only and that emits substantially white light by a fluorescent material.

(20) In the embodiments above, the LED that includes an LED chip emitting blue light only and that emits substantially white light by a fluorescent material was used, but the present invention also includes a configuration using an LED that includes three types of LED chips each emitting only one of red, green, and blue. In addition, the present invention includes a configuration using an LED that includes three type of LED chips each emitting only one of C (cyan), M (magenta), and Y (yellow).

(21) In the embodiments above, LEDs were used as the light source, but it is apparent that other types of light sources (such as organic EL) can be used.

(22) In the embodiments above, TFTs were used as the switching elements of the liquid crystal display device, but the present invention can also be applied to a liquid crystal display device that uses other switching elements than the TFTs (such as thin film diodes (TFD)), and in addition to a color liquid crystal display device, the present invention can be applied to a liquid crystal display device that displays a black and white image.

(23) In the embodiments above, a liquid crystal display device using a liquid crystal panel as a display panel was described as an example, but the present invention can be applied to a display device that uses another type of display panel.

(24) In the embodiments above, a television receiver including a tuner substrate was described as an example, but the present invention can be applied to a display device that does not include a tuner substrate.

DESCRIPTION OF REFERENCE CHARACTERS 10 liquid crystal display device (display device)
11 liquid crystal panel (display panel)
12 backlight device (illumination device)
14 chassis
14a bottom plate (bottom portion)
14e insertion hole
15 optical member
17 LED (light source)
18, 118 LED substrate (light source substrate)
19, 119, 219, 319, 419, 519 LED housing chassis (light source housing member)
19d, 119d, 419d, 519d air hole
20, 520 lens member (light guide member)
20a light guide part
20b diffusion lens part
23 second restricting member (restricting member)
24, 524 spacer
25 heat sink
26, 226, 426 suction fan
27, 527 insulating member
29 second heat sink (heat sink)
30 second air hole (air hole)
31 second suction fan (suction fan)
33 cooler
34 exhaust fan
119a first bottom wall (wall)
119d first air hole (air hole)
125 first heat sink (heat sink)
219d1, 319d1 air hole
126 first suction fan (suction fan)
319d2 air hole
IS1 first space
IS2 second space
TV television receiver

The invention claimed is:

1. An illumination device comprising:
a chassis that has an opened section;
an optical member disposed to cover the opened section of the chassis;
a light source disposed outside of the chassis;
a light guide member disposed in such a structure as to penetrate the chassis, the light guide member guiding light emitted from the light source into the chassis;
a light source housing member that stores the light source therein, the light source housing member being attached to the chassis,
wherein the light source housing member has a wall that divides an inner space thereof into a first space and a second space, the first space being on a side of the chassis, the second space being on a side opposite to the chassis, and
wherein the light source is attached to said wall so as to be located in the first space.

2. The illumination device according to claim 1, wherein the light source housing member has a first air hole and a second air hole, respectively, the first air hole opening toward an outside of the light source housing from the first space, the second air hole opening toward an outside of the light source housing from the second space.

3. The illumination device according to claim 2, further comprising a suction fan that blows air into the light source housing member from the outside through the first or second air hole.

4. The illumination device according to claim 3, further comprising a cooler that cools air that is blown by the suction fan.

5. The illumination device according to claim 2, further comprising an exhaust fan that blows air out from an inside of the light source housing member through the first or second air hole.

6. The illumination device according to claim 2, further comprising:
a light guide substrate attached to the wall so as to be located in the first space, the light guide substrate having a plurality of said light sources mounted thereon;
a first heat sink attached to the light source substrate; and
a second heat sink attached to the wall so as to be located in the second space.

7. The illumination device according to claim 6, wherein the second heat sink is disposed so as to match in position with the light source in a plan view.

8. The illumination device according to claim 1, wherein the chassis has a bottom part that faces the optical member that covers the opened section, and
wherein the light source housing member is disposed on said bottom part on a side opposite to the optical member.

9. The illumination device according to claim 8, further comprising a restricting member between respective opposing surfaces of the bottom part and said wall in the light source housing member, the restricting member setting a gap between said respective opposing surfaces.

10. The illumination device according to claim 1, further comprising an insulating member between the chassis and the light source housing member.

11. The illumination device according to claim 1, wherein the chassis has an insertion hole that is an opening through which the light guide member is inserted,
wherein a spacer is interposed between an edge of the insertion hole and the light guide member.

12. The illumination device according to claim 1, wherein the light guide member has a light guide part at one end located outside of the chassis and a diffusion lens part at another end located inside of the chassis, the light guide part guiding light from the light source toward said another end, the diffusion lens part diffusing light.

13. The illumination device according to claim 12, wherein the diffusion lens part is in a dome shape.

14. The illumination device according to claim 1, wherein the light source is an LED.

15. A display device, comprising:
the illumination device according to claim 1; and
a display panel displaying images by using light from the illumination device.

* * * * *